United States Patent [19]

Videki, II

[11] 4,396,984
[45] Aug. 2, 1983

[54] PERIPHERAL SYSTEMS EMPLOYING MULTIPLATHING, PATH AND ACCESS GROUPING

[75] Inventor: Edwin R. Videki, II, Tucson, Ariz.

[73] Assignee: International Business Machines Corporation, Armonk, N.Y.

[21] Appl. No.: 241,174

[22] Filed: Mar. 6, 1981

[51] Int. Cl.³ .............................................. G06F 3/00
[52] U.S. Cl. ................................................. 364/200
[58] Field of Search ........................ 364/200 MS File

[56] References Cited

U.S. PATENT DOCUMENTS 3,732,546  5/1973  Ronkin et al. ...................... 364/200
4,044,333  8/1977  Auspurg et al. .................... 364/200
4,207,609  6/1980  Luiz et al. ........................... 364/200

Primary Examiner—Raulfe B. Zache
Attorney, Agent, or Firm—Herbert F. Somermeyer

[57] ABSTRACT

A data-processing system is connected to a peripheral system by a plurality of channel paths. These channel paths are named as members of path groups. Each path group has one or more channel paths. Within each path group, communications between the data-processing system and the peripheral system are multipathed among the paths in such path groups. Devices within the peripheral system are selectively assignable to access groups for exclusive use within one or more of such path groups; a given path group selectively provides communication paths for each device in an access group. Each access group includes one or more path groups. Temporary suspension and reassignment facilities are disclosed. Both devices and channel paths can be either in a grouped or ungrouped state. The assignment function to access groups is particularly useful in interleaved channel transfers for ensuring subsystem integrity.

21 Claims, 28 Drawing Figures

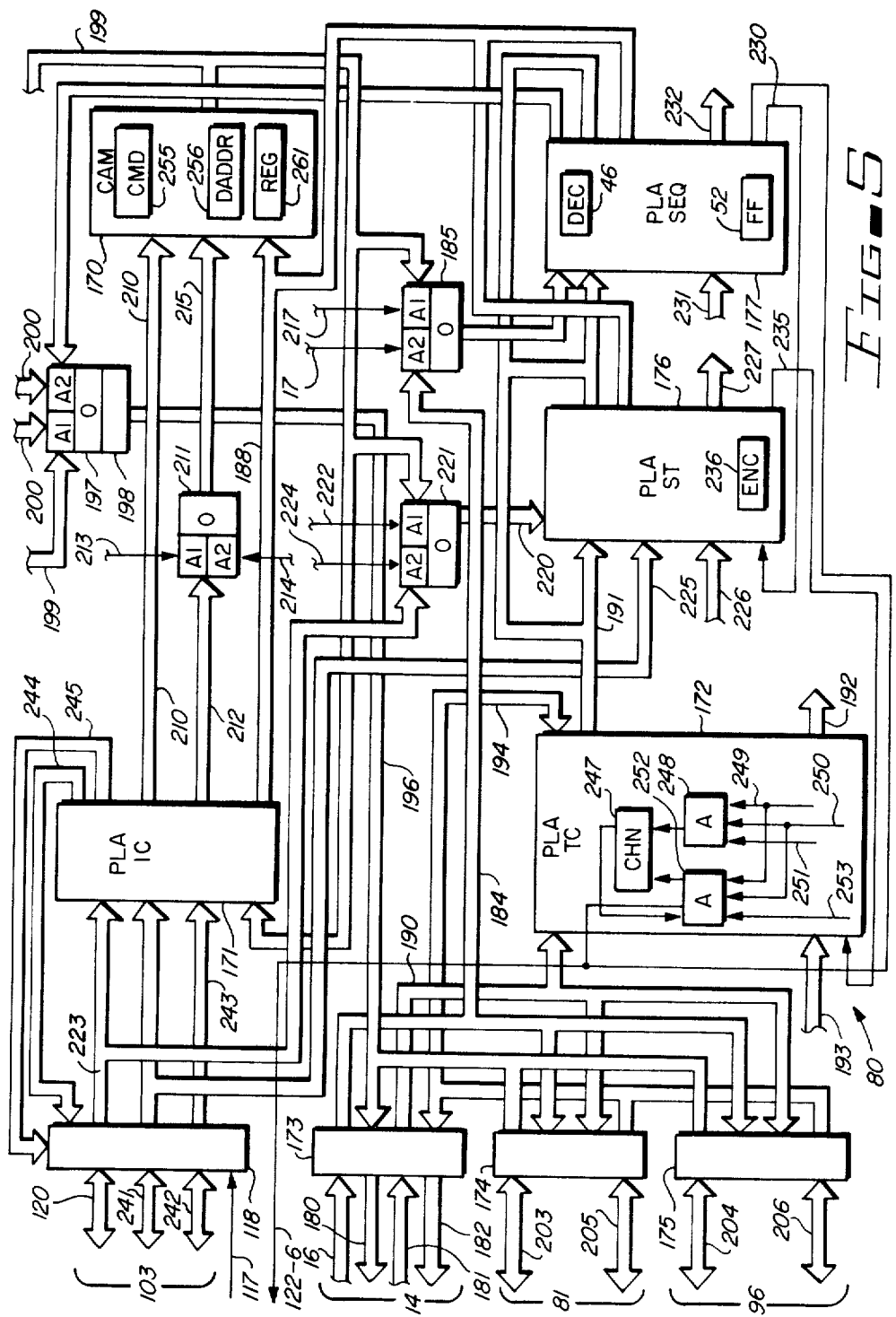

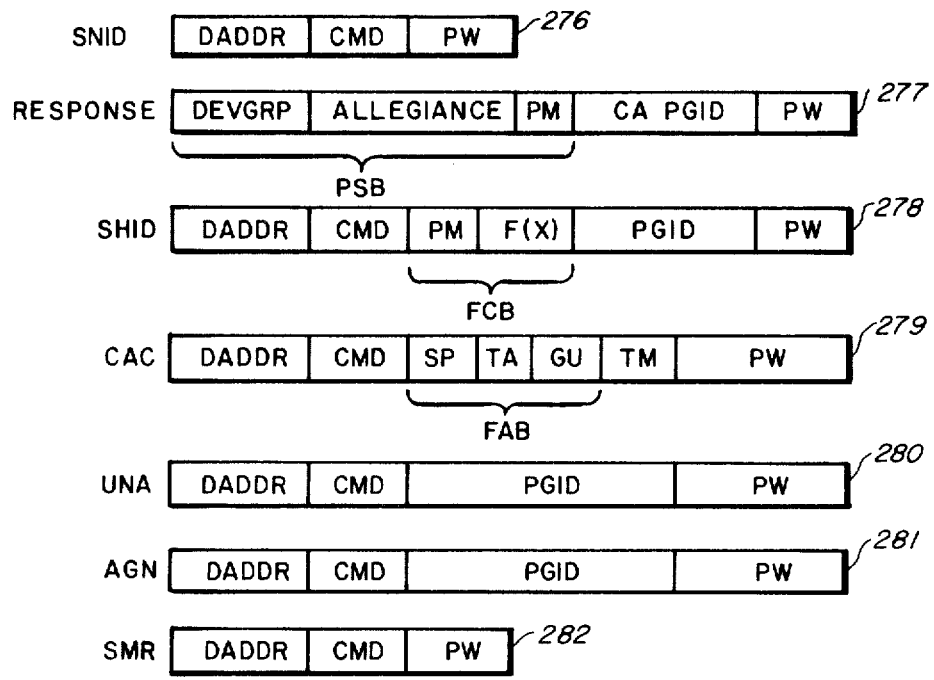

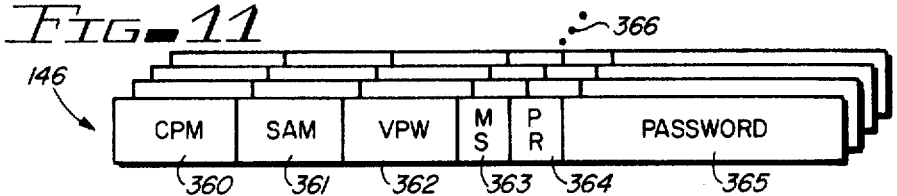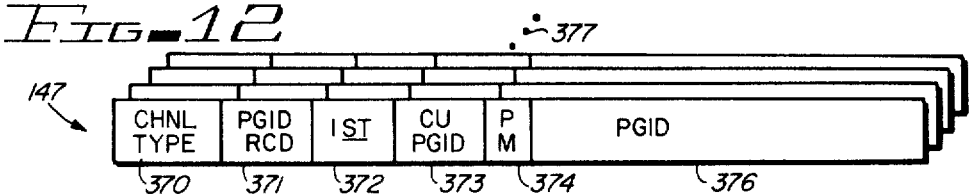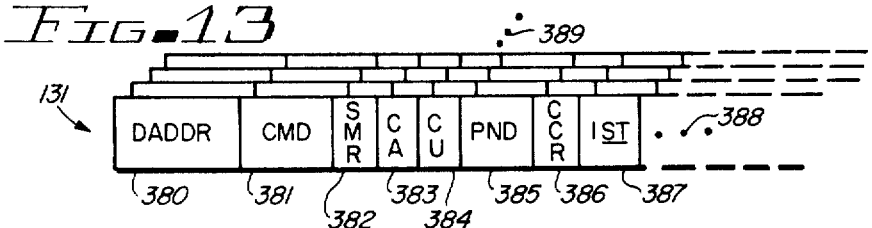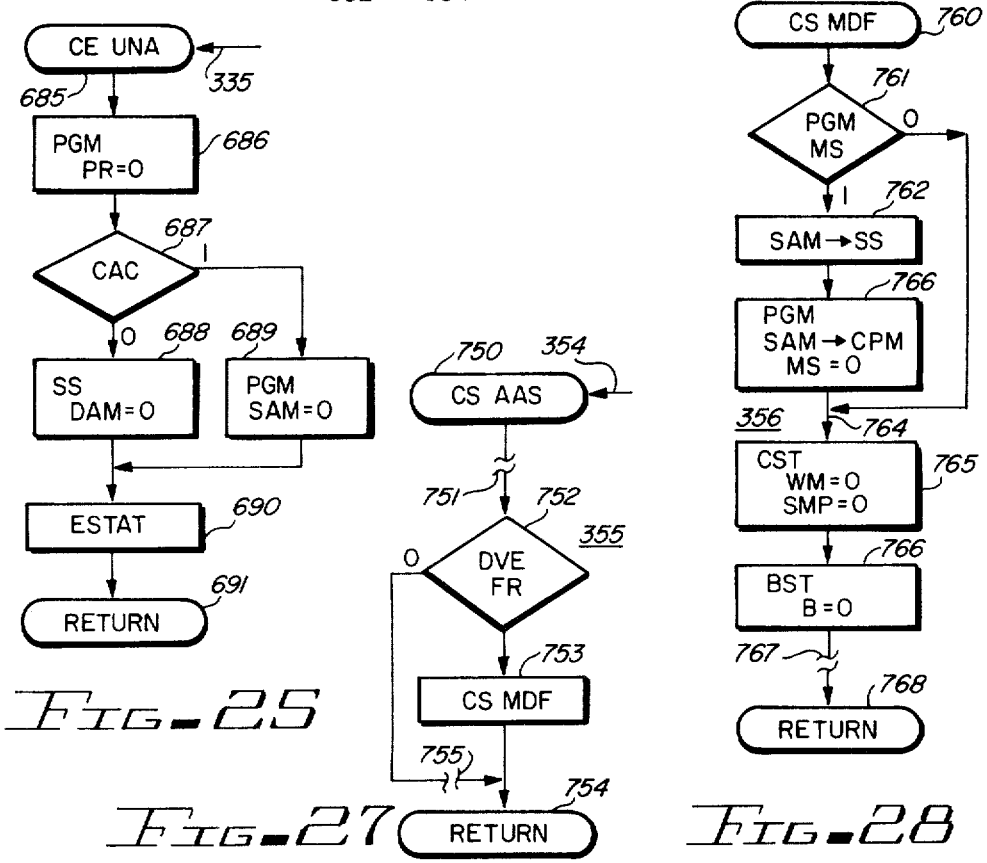

PERIPHERAL SYSTEMS EMPLOYING MULTIPATHING, PATH AND ACCESS GROUPING

DOCUMENTS INCORPORATED BY REFERENCE

U.S. Pat. No. 4,207,609 shows establishment, usage and disbanding of channel path groups between a data processing system and a peripheral system having a plurality of control units and peripheral devices.

"IBM System/360 and System/370 I/O Interface Channel to Control Unit Original Equipment Manufacturers' Information", publication GA22-6974 by International Business Machines Corporation, Armonk, N.Y., herein referred to as "OEMI".

BACKGROUND OF THE INVENTION

The present invention relates to the control of peripheral systems employing a plurality of devices and control unit(s); particularly the controls are those facilitating multipath access and subsystem integrity through the use of a hierarchical group control methodology and apparatus.

Peripheral systems attachable to hosts or central processing units (CPUs) have a critical relationship to total data processing system performance. It is essential for high performance that the peripheral systems attached to a host or plurality of hosts provide rapid access to the devices for performing a plurality of data processing operations. Additionally, to ensure control of the data processing operation, the peripheral system should provide integrity of the data processing operation; this aspect is particularly important when multi-users are time sharing the peripheral system.

In plural unit/device configurations, such as used in multiprocessor data processing installations, configuration control has been used for providing integrity and performance enhancement. For example, Stafford U.S. Pat. No. 3,386,082 relates to configuration control of a multiprocessor environment. FIG. 4 of that U.S. patent shows a tape control unit TCU capable of responding to configuration control commands received from a host. Each host in the Stafford patent has a configuration control register CCR which controls the flow of signals with respect to the host. Each unit communicating with any other unit has a configuration control register which allows or inhibits that particular unit/device from communicating wsith another particular unit. Hence, this U.S. patent teaches logical configuration control which can also be termed logical partitioning. While this patent does show a high degree of flexibility, a greater integrity control at low cost is still needed for peripheral systems, such as storage systems employing tape or disk type magnetic recorders.

Enhanced accessing of devices of peripheral systems can be achieved by multipathing. An example of this is shown in the document incorporated by reference, U.S. Pat. No. 4,207,609, which teaches the concept of path groups with a memory in the peripheral system for enforcing the path group concept of multipathing. The path grouping of this latter identified patent, while enhancing multipathing, does not provide for long term control of a peripheral system as may be desired for system integrity purposes.

Accordingly, it is desired to extend the multipathing control while maintaining a high degree of integrity in the peripheral system.

Other approaches to providing control of peripheral systems include the concept of a so-called logical channel in U.S. Pat. No. 4,060,849. This later patent does not show the concept of path grouping, thereby limiting control flexibiltiy at the peripheral system level. Additionally, permissive coupling of different subsystems have been employed, see U.S. Pat. Nos. 3,768,074 and 3,812,469. Such permissive coupling, as taught in those patents, appears to be achieved in processing groups of elements by transmission of system configuration codes and validation signals. These patents appear to be a sub-group of the teaching in the Stafford patent, supra. Further, logical partitioning of a multi-unit data processing system is shown in U.S. Pat. No. 3,641,505 which has a specific partition, apparently another subset of the Stafford teaching.

SUMMARY OF THE INVENTION

It is an object of the present invention to provide enhanced multipathing control while enhancing system integrity on a long-term basis.

A peripheral data system has a control unit connected to a plurality of peripheral devices for selectively transferring information-bearing signals between the devices and one or more hosts connectable to the control unit. The peripheral system includes means for establishing a plurality of path groups extending between the control unit and said hosts. Each path group has at least one or more paths (channel adapters) in the control unit for enabling use of any path of a given path group for diverse communications. The control unit has assign means to selectively and dynamically assign and indicate assigned ones of the devices to operate with certain paths to the hosts. The assign means is capable of assigning a plurality of devices to one or more of the host paths in the plurality of access groups. Activation of the groups is a first or lower level control establishing path groups for device to host allegiance, as set forth below. Further provided are sense means responsive to a status request by any of the hosts irrespective of the access groups, to supply peripheral systems access and path group status signals to any requesting host. UNIT CHECK means in the control unit are responsive to requests from a first requesting host via any path outside any access group to which a device is not assigned to signal a request error to the first requesting host. Unassign means in a control unit respond to a request from a host via a path to which the given device is assigned to remove the access group indication from the given device or to disband the access group. Control means in the control unit detect error conditions possibly relating to the assign means and having means to inhibit the assign means from assigning a device upon detection of predetermined error conditions. Means are provided for suspending multipath reconnections within a path group for a given chain of channel command words (CCW's). Further, means are provided for a given chain of CCW's to activate a temporary path group and assignment for an addressed device for allowing a primary host, for example, access to any of the devices for performing data processing, supervisory or other related functions independent of the access groups.

In accordance with the above, the present invention in certain aspects relates to a hierarchical control of a peripheral system in that a first level of control which establishes path groups, such as taught in U.S. Pat. No. 4,207,609. Overlaying this first level of control is a second level of control, called the assign function, which dynamically establishes access groups which can be activated with respect to any of the given devices. Also provided are override means for the multipath reconnections and the access groups. In the preferred mode, a microprocessor establishes memory tables indicating the path groups and the second level of control, which are termed access groups, such that each instant device access (allegiance) can be determined via the path groups while the permitted access to a device is determined by the access groups. Other aspects of the hierarchical control, which is not limited to two levels of control, will be found in the continued reading of the specification.

The foregoing and other objects, features and advantages of the invention will be apparent from the following more particular description of preferred embodiments of the invention, as illustrated in the accompanying drawings.

DESCRIPTION OF THE DRAWING

FIG. 5 is a logic block diagram of a channel adapter usable with the FIG. 2 illustrated control unit.

FIG. 7 illustrates in logic form the various input/output commands used in connection with the FIG. 2 illustrated system for practicing the present invention.

FIG. 8 illustrates the logic flow of the control for the FIG. 2 illustrated peripheral system used in connection with practicing the present invention.

FIG. 9 shows a path group control used in the FIG. 6 illustrated status store.

FIG. 10 illustrates a device assignment mask (DAM) used in the FIG. 6 illustrated status store.

FIG. 11 illustrates a path group map used in connection with each of the control units of the FIG. 2 illustrated peripheral system.

FIG. 12 illustrates a path group table used in connection with the FIG. 2 illustrated control unit.

FIG. 13 illustrates a command status table used in connection with the FIG. 2 illustrated control unit.

FIGS. 14 through 28 illustrate the various microcode logic modules used in connection with the FIG. 2 illustrated control as tabulated below for the respective figures:

| FIGURE NO. | LOGIC NAME | BRIEF DESCRIPTION |
|---|---|---|
| 14 | CS DCD | Decode commands |
| 15 | CS SCE | Start command execution |

-continued

| FIGURE NO. | LOGIC NAME | BRIEF DESCRIPTION |
|---|---|---|
| 16 | CS SPG | Start path grouping |
| 17 | CE PGC | Path group checking |
| 18 | CS ZCK | Zero check path group |
| 19 | CS MPG | Match path group |
| 20 | CE PGE | Perform group establishment |
| 21 | CE PGR | Perform group resign/disband |
| 22 | CE SID | Sense path group |
| 23 | CE SMR | Suspend multipath reconnection |
| 24 | CE ASN | Execute ASSIGN command |
| 25 | CE UNA | Execute ASSIGN command |
| 26 | CE CAC | Execute control ACCESS command |
| 27 | CS AAS | Analyze adapter status |

DETAILED DESCRIPTION

Figure 1:
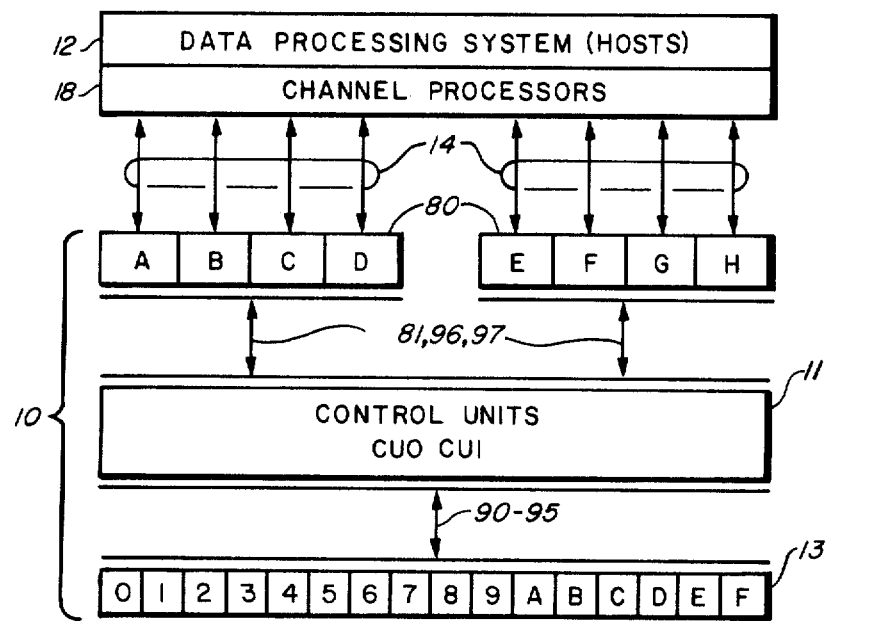
FIG. 1 illustrates a peripheral system employing the present invention which shows implementation of the invention in block diagram form accompanied with a legend which illustrates the symbology and the operative effects of practicing the invention in the system.

Referring now more particularly to the drawing, like numbers indicate like parts and structural features in the various diagrams. In FIG. 1 numeral 10 denotes a peripheral system having a plurality of control units, CU-0 and CU-1 collectively denominated by numeral 11, selectively connectable to a data processing system 12. Data processing system 12 includes a plurality of hosts which may consist of a part or a plurality of central processing units, CPU's. A plurality of peripheral devices 13, such as magnetic tape drives, disk drives and the like, are selectively connected to data processing system 12 through the plurality of control units 11 via a plurality of paths, including channel adapters 80. Channel adapters 80 are connected to a plurality of channel processors 18 via input/output connections 14, constructed in a usual manner in accordance with OEMI, supra. A plurality of connections 90–95 connnect the control units 11 to the plurality of devices 13 such that any control unit can selectively connect any of the devices 13 through any of the channel adapters 80 to data processing system 12. Channel adapters 80 are enumerated A through H. In a constructed version of the invention, adapters A–D are resident in and controlled by control unit CU-0 while adapters E through H are resident in and controlled by control unit CU-1. Either control unit, however, can communicate data signals with any of the eight channel adapters 80. Peripheral devices 13 are enumerated "0" through "F" for representing 16 devices, no limitation thereto intended.

For multipathing and integrity control, the devices 13 and channel adapters 80 are selectively assigned to access groups which define permitting accessing to the devices 13, as will become more apparent. Reservation of the devices 13 to a host of system 12 is through the usual reservation and reconnection protocol, as is widely practiced in the data processing art (see OEMI) and as modified by United States patent Luiz et al U.S. Pat. No. 4,207,609, which shows path grouping for multipath reservations and reconnections. The present invention extends that multipathing control by providing access groups which define permitted device reservations (allegiances) of each device 13 within selected access groups or by providing free access to any device (ungrouped). The table of FIG. 1 defines one peripheral system's 10 set of path and access groups. Each path group includes one or more paths to hosts 12; each path is identified by its included channel adapter 80 plus the individual channel processors collectively enumerated 18. In each path group, a device 13 addressed by a host 12 may receive a command via any path and reply or reconnect via any other or the same path within the path group. Each path group has a path-group identification PGID as listed in column 22. In table 23, PGID 023 represents a path group including channel adapters A, D, E and H; path group 046 includes channel adapters B and G, path group 010 only includes channel adapter C while group 011 has channel adapter F. Any device 13 can be addressed via any path group to take advantage of the multipath reconnections mentioned above. Each path group is usually associated with one host; one host may have more than one such group. In U.S. Pat. No. 4,207,609 the corresponding identification is the host identification. The multipath reconnections afforded within a single path group are preferably limited to one host; no limitation thereto is intended. that is, each channel adapter 80 is connected to but one host to have but one PGID.

Access groups illustrated in table 24 establish permitted accesses to the identified devices 13 via one or more path groups or via a designated ungrouped channel adapter 80; i.e., a channel adapter 80 which is not a member of a path group. Again, the paths are identified by channel adapters 80. One device is in an access group, i.e., the access group exists on behalf of that one device. In this sense, a device can "have or own" an access group. Device 0 is in an access group permitting access via channel adapters A, D, E, and H corresponding to path group 023. Hence, only the host represented by PGID 023 can access device 0 during normal operations. Device 1 has an access group having channel adapters A, C, D, E, and H permitting access by hosts 12 via path groups 023 and 010. Device 2 does not have an access group, hence it is in an ungrouped state permitting access via any path, i.e., any host 12 can access device 2. Device 3 has an access group including only channel adapter F of path group 011. Device 4 has an access group of all channel adapters 80 A–H for permitting access via any of the path groups. Since there are no ungrouped channel adapters 80, the practical effect is to permit access via any path as if device 4 were in an ungrouped state. The access control for this device 4 is different from access control for device 2, as will become apparent. Devices 5 and F have the illustrated access group structures.

Accordingly, the access groups permit a plurality of devices 13 to be selectively associated with a given host via a plurality of selected path groups. A given device 13 can be accessed by a plurality of hosts through a plurality of path groups. Both the access groups and the path groups can be dynamically changed. The access group persists for a plurality of channel command chains while a path group exists for the duration of a given configuration of a data processing system, viz., reflects the logical connections of hosts 12 to peripheral system 10.

An attempted selection of (i.e., activation of a path group) a device assigned to one or more access groups via a path not a member of any one of those access groups is rejected as an error condition. For example, device number 0, if attempted to be accessed through channel path F while it has the indicated access group including path group 023, would result in an error indication being sent to the requesting host 12. Accordingly, each access group defines permitted path groups or allegiances for a plurality of devices to be established on a dynamic basis, as will become more apparent.

A primary host may be designated in some multiprocessor types of data processing systems 12. This primary host may desire to access a device 13 for one or more reasons. Also, a primary host can permit access to one or more devices 13 by one or more other hosts 12 by the primary host's issuance of an ASSIGN command which specifies the PGID value of the other hosts. In this case, the primary host uses ASSIGN to expand the access group to include additional hosts. Note that the primary host must first be permitted access by way of the existing access group of the addressed device 13 before it can expand the access group. Accordingly, a control access peripheral command CAC is provided, as later detailed. For example, even though channel path F is not a member of any of the access groups of device number 1, a CAC peripheral command can be supplied over channel path F to associate device number 1 with a host via channel path F, for the duration on one chain of peripheral commands. This override facilitates error recovery as well as multiprocessor discipline in a data processing installation. In a similar manner, a device number 0 can be temporarily made a member of a path group 046 such that it can broadcast its responses for reconnections via channel paths B and G rather than paths A, D, E, and H.

For one reason or another, a host 12 may desire to receive a response only via one of the plurality of possible channel paths in PGID 023. Accordingly, it may supply a later described suspend multipath reconnection (SMR) command such that for one chain of commands device number 0 will respond to the selecting host of data processing system 12 via channel path E only.

Accordingly, it is seen that one access group can include one or more possible path groups, one path group being active at a given instant for a given device 13. As an exception to the above restrictions of access, a certain set of commands from data processing system 12 to peripheral system 10 ignores the access group limitations set forth above. These commands are a SENSE (see OEMI), SHID (which sets a PGID for a device 13), command access control command (CAC) and SNID (which senses the PGID with which a device 13 is associated). The exception for SENSE and SNID is to allow status information to freely flow from peripheral system 10 to data processing system 12. The channel command SHID sets a path group identification for a device 13, as later described, and is used in connection with establishing the supervisory and operation controls as practiced in peripheral system 10 in accordance with the present invention. In general, the access groups are intended to be a relatively long term arrangement as opposed to a single channel command chain operation. Attempted violation of the access groups results in an error condition being reported as opposed to a busy condition for a violation of the path group reservation-reconnection control. A set of access groupings can be altered by later described channel commands received over paths that are members of the access group. Commands received over paths that are not members of any of the groups will be rejected. The access groups can be altered or disbanded at will. A change in a path group set of paths results in the same change of the corresponding access groups sets of paths.

Figure 2:
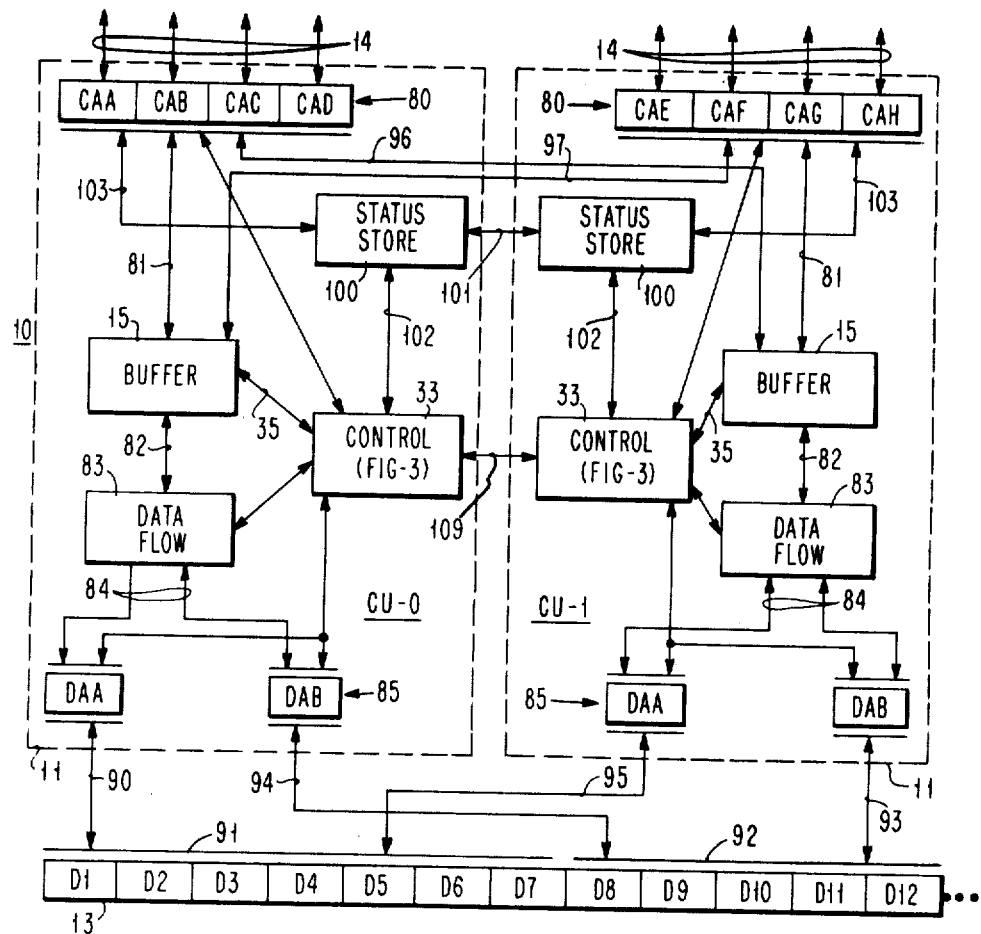
FIG. 2 is a block diagram of a two control unit peripheral system which can advantageously employ the present invention, also as shown in FIG. 1.
Figure 3:
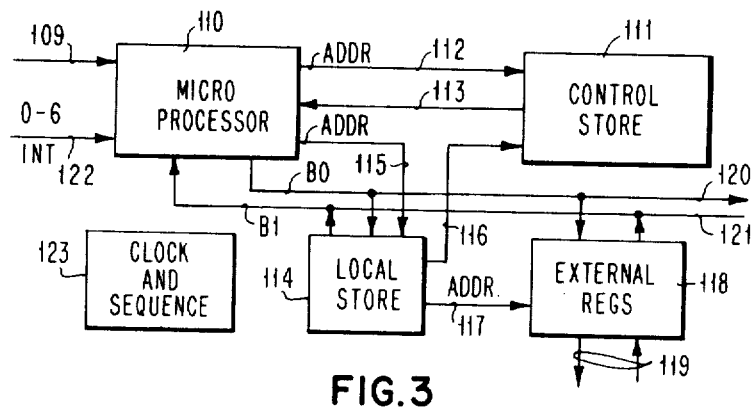
FIG. 3 is a block diagram of a control portion of a control unit used in connection with the FIG. 2 illustrated peripheral system.
Figure 4:
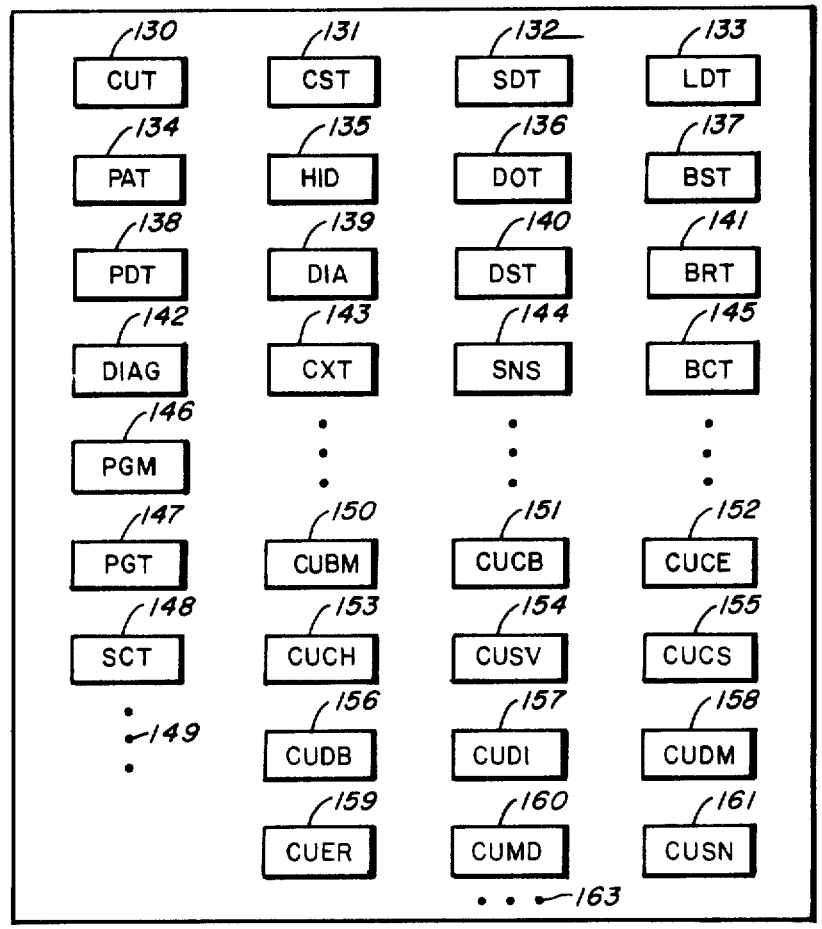
FIG. 4 is a map of a control store of the FIG. 3 control illustrating various logic modules used in operating the FIG. 2 illustrated peripheral system.

Before further describing the invention, the environment in which the invention preferably resides is described with particular reference to FIGS. 2–4 which illustrates a storage subsystem employing reel-to-reel tape drives denominated as devices 13D-F (FIG. 2 only shows devices numbered 1-12). The preferred arrangement includes two control units 11 denominated as CU-0 and CU-1. The arrangement is such that any of the devices can be connected to the host 12 via input-/output channel 14 through either of the control units, CU-0 or CU-1. The attachment to a host 12 by each of the control units 11 is via a plurality of channel adapter circuits 80 which are individually denominated CAA--CAH. Each of the channel adapters 80 can communicate directly with a buffer 15 in either control unit 11. Both CU-0 and CU-1 are identically constructed. Accordingly, like numerals are indicating like parts in the two control units with the interconnections between the two control units being separately denominated. Channel adapters CAA-CAD are in CU-0 while CAE-CAH are in CU-1. The respective channel adapters 80 communicate with a buffer 15 in its own control unit via cable 81. Communications from the buffers to the devices 13 is over cable 82 through a data flow circuit 83, thence to cable 84 through a plurality of device adapter circuits 85. The device adapter circuits are separately denominated by characters DAA through DAB in both control units 11. Data flow circuits 83 contain recording circuits. The programmed control 33 is electrically connected to all of the described portions of the respective control units 11 and operates generally in a known manner for storage subsystems as generally shown in Irwin U.S. Pat. No. 3,654,617, filed in U.S.A. Oct. 1, 1970, application number 77,088. The interconnections between the control units 11 and the devices 13 is on a primary/secondary basis. Devices D0-D7 are primary to CU-0 and secondary to CU-1. In a similar vein, devices D8--D F are primary to CU-1 and secondary to CU-0. The significance of primary and secondary connections relates to which of the control units CU-0 or CU-1 maintain status for the respective devices; i.e., the control unit CU-0 maintains status information for D0-D7 while CU-1 primarily maintains status information for D8-D16. As will become apparent, both control units CU-0 and CU-1 memorize status indications for all of the devices 13. In the primary connections, device adapter 85 DAA of CU-0 is connected via a cable 90 to all of the devices D0-D7. In a similar manner, the connection to devices D8-DF from CU-1 is via cable 93 through its device adapter 85 DAA. The secondary connection from CU-0 to devices D8-DF is via its device adapter 85 DAB and cable 94 while CU-1 is connected to device D0-D7 via its device adapter 85 DAB and cable 95. The operations between the device adapters 85 and the various devices D0-DF includes tag control lines and bus data transfer lines which enable the control units 11 to closely control and operate devices 13.

In prior tape subsystems, the data flow paths were not fully multi-pathed in that the channel adapters 80 communicated only with the data flow circuits 83 in its respective control unit 11. In the preferred configuration, any of the channel adapters CAA-CAH can communicate with any of the devices 13 through a data flow circuit 83 in either control unit 11. The internal control unit 11 connection from the channel adapters CAA through CAD and adapters CAE-CAH of CU-1 are as previously described. Connections from channel adapters CAA-CAD to the buffer 15 of CU-1 are via cable 96 whereas channel adapters CAI-CAH connect to the buffer 15 of CU-0 via cable 97. Accordingly, either data flow circuits 83 or buffer 15 can communicate with any of the hosts via any of the channel adapters. This arrangement, of course, requires close coordination between control units 11.

The total subsystem status is maintained in each of the control units 11 via a pair of status stores 100. Status stores 100 communicate with each other via a cable 101 independent of data processing operations; that is, as soon as CU-0 changes status, such as by selecting a device 13, the status store 100 in CU-0 immediately communicates to status store 100 in CU-1. Similarly, any active crossconnection between the channel adapters 80 and the buffers 15 is immediately indicated in both status stores 100. Each of the status stores 100 contain a plurality of registers for containing bits relating to device status, buffer status, channel status and the like. Such status information reflects the selection status of the device, its busy status, contingent connections and all other status necessary for operating the storage subsystem with the input/output channels 14.

One and only one control unit 11 can change the configuration of the storage system at a given time. In this regard, cables 102 extend from the respective status store 100 to control 33. When control 33 of CU-0 wants to change the logical configuration of the subsystem by selecting a device 13, for example, control 33 communicates with its status store 100 and requests permission to change subsystem status. Status store 100 is in an appropriate master state and permits control 33 to make a selection. Otherwise, status store 100 of CU-0 requests the status store 100 of CU-1 to give it the master state. Either CU 11 having the master state is the only one which can change logical configuration of the subsystem; the master state being shifted between the control units as configuration changes dictate. Status stores 11 also communicate with the respective channel adapters in the control units 11 via cables 103. Such communication includes the supplying of device busy status to the channel adapters from the status stores and the request for selection from the channel adapters to the status stores; that is, if CAB 80 wants to select device D6 on behalf of a host request, CAB 80 communicates with its status store 100 of CU-0 requesting that the device D6 be selected. Status store 100 will supply the busy or not busy status of D6 to CAB. CAB then immediately responds to the host request with respect to device D6, thereby reducing selection and inquiry time between a host 12 and control units 11. Control 33 can take different configurations. The configuration preferred for use in connection with the FIG. 2 illustrated storage subsystem is shown in FIG. 3. A programmed microprocessor 110 operates in accordance wuth microcode programs stored in control store 111. Such microprograms enable microprocessor 110 to completely manage buffer 15, to supervise data flow circuit 83, to communicate with status store 100, and to supervise and enable selection of the channel host adapters 80 and device adapters 85. Further communication between controls 33 in the two CU's 11 on a processor-to-processor basis is via cable 109 using known interprocessor communications techniques. Using known techniques, microprocessor 110 selects the microprograms of control store 111 via address bus 112. Control data is supplied from the control store 11, includes microprogram instruction words, via bus 113. Of course, the usual idle scan loop for operating microprocessor 110 is resident in control store 111. Additionally, control 33 includes local store 114 which acts as a working control store for microprocessor 110. The addressible registers of local store 114 are addressed via bus 115. Bus 116 transfers signals from local store 114 to control store 111 under control of microprocessor 110; that is, it is preferred that the data stored in control store 111 from microporcessor 110 be transferred via local store 114. Communications between control 33 and all of the items shown in the control units 11 are via sets of external registers 118 which are addressed by address signals supplied over bus 117 from local store 114, no limitation thereto intended. Communications from external registers 118 to the various elements of the control units 11 are via a pair of unidirectional buses 119 which are electrical connections made in the usual manner.

Microprocessor 110 includes the bus out BO 120 and a bus in BI 121 which are connected to local store 114, external registers 118 and other units as may be desired. Microprocessor 110 is interrupt driven through a plurality of interrupt levels. These interrupts are supplied by the various elements of the control unit 11 over bus 122 which carries interrupt signals having levels 0 through 6, the priority of which is preassigned in accordance with the functions to be performed in the storage subsystem. The electrical signal timing of control units 11 is by clock and sequencer 123. Not only does clock and sequencer 123 provide timing pulses, but sequences microprocessor 110 for initializing control 33 to properly operate the control unit 11. The connections 119 from external registers 118 are to all the other portions of control unit 11.

FIG. 4 is a map of control store 111 showing control tables and microprogram groups. The tables, of course, contain those signals representing control information necessary for the successful operation of the storage subsystem. First the tables are described.

CUT 130 is a so-called control unit operation table which contains information-bearing signals pertaining to the entire control unit 11. This table relates to the operational status of the individual control unit CU-0 and CU-1 and which is not device 13 nor channel 14 related. CST 131 is a command status table which contains information-bearing signals describing the current command status which is being executed for an addressed device 13; that is, host 12 supplies channel commands over I/O channel 14 to the respective control units 11. CST 131 reflects the present status of the execution of those commands received by any of the channel adapters 80. SDT 132 contains information-bearing signals signifying the status of a selected device 13. This table enables the control units 11 to closely control and operate any of the devices 13. LDT 133 is a so-called logical device table which contains information-bearing signals signifying the status of each of the devices 13 as those devices are logically extended into the buffer 15 and the broad operational status of the respective devices which status information is more general in character than that appearing in SDT 132. PAT 134 is pending allocation table having information-bearing signals which queue devices 13 by their respective addresses which require buffer space when buffer space has not yet been allocated. The table is preferably a FIFO (first in, first out) table of the circular type. HID 135 is a table containing host identification signals for the hosts 12 communicating with the control units 11 via channel adapters 80. DOT 136 relates to device operations and contains information-bearing signals signifying schedule, active and completed device 13 operations. Such operations include tape transport, reading and writing and the like. BST 137 contains information bearing signals relating to the status of the buffer 15. Such information-bearing signals relate to data transfers into and out of the buffer, allocation of buffer space and other buffer related functions. PDT 138 contains information-bearing signals signifying the buffer space of the buffer 15 which can be deallocated from devices 13 as soon as the activity with respect to such buffer space ceases. Deallocation does not occur until such activity stops. DIA 139 contains information signals signifying device information, control data relating to devices 13 and concerned with input/output channel 14 as well as intercontrol unit communication over cable 109 is stored here. Such information may originate because of device 13 operations as well as channel 14 operations. DST 140 stores information bearing signals relating to device status; that is, the last device status presented by the device 13 to control units 11 is stored in this area, BRT 141 relates to the operation of buffer 15. This table identifies the status of records in the buffer 15. Each record in the buffer will be entered into BRT 141 and may contain characterizing signals showing the status of the record with respect to its storage in buffer 15. DIAG 142 is a table used to control diagnostic functions executed in the control unit 11. CXT 143 contains information-bearing signals relating to transfer of signals between buffer 15 and any of the I/O channels 14 via the channel adapters 80. Such information includes direction of transfer and the address of the device 13 related to such transfer. SNS 144 holds information-bearing signals representing sense data to be reported to a host 12 as well as a so-called buffered log arranged by device 13 addresses. BCT 145 stores information-bearing signals relating to the dynamic logical address configuration of buffer 15. Such configuration will vary in accordance with the number of devices 13 connected to the control units, as well as whether there is one control unit 11 or two. PGM 146 is a so-called path group map which indicates which devices 13 may be logically connected to channel adapters 80 for logically partitioning the subsystem into one or more logical storage units. Path group table PGT 147 complements PGM 146 in that it includes identification signals identifying the logical partition and which of the channel adapters 80 is resident within each of the logical partitions. SCT 148 is a table containing signals relating to the idle scan for determining if any activity is to occur with respect to a given device 13. A diversity of actions can be instituted via SCT 148.

Numeral 149 indicates other tables not specifically referred to herein but that could be found in a constructed embodiment of the FIG. 2 illustrated storage subsystem. Such entry may include indications identifying the free space of buffer 15, priority queues for space of buffer 15, a segmentation indication for buffer 15, tracing status, timer tables for controlling time-outs and other miscellaneous areas necessary or desirable for constructing a multiple device storage subsystem.

Various program groups include CUBM 150 which are the microcode programs relating to the management of a buffer 15. CUCB 151 identifies those microcode programs relating to the transfer of signals between an I/O channel 14 and buffer 15 via channel adapters 80. CUCE 152 relates to setting up the tables described above in preparation for executing a command received from a host 12 over input/output channel 14. CUCH 153 relates to the channel control aspects, such as device selection and the like. CUSX 154 relates to an interrupt supervisor as it uses scan vectors in determining priority of the interrupts. CUCS 155 is a command support set of microcode which executes the commands set up by CUCE 152. CUDB 156 relates to the control and supervision of signal transfers between devices 13 and buffer 15. CUDI 157 relates to the control of the device adapters 85. CUDM 158 relates to the management of devices 13 such as scheduling their operations, etc. CUER 159 relates to error detection and recovery microcode. CUMD 160 relates to diagnostic procedures executed by a control unit 11. CUSN 161 relates to handling sense data such as stores in SNS 144. Numeral 163 indicates that the above program groupings may be modified and extended as the need arises for a storage subsystem.

The major components of the FIG. 5 illustrated channel adapter CA 80 include a channel adapter memory CAM 170 and a plurality of programmable logic arrays (PLAs). A first PLA 171 provides for internal communication (IC), such as communication with microprocessor 110 via connection 103 and the major components of CA 80. The second PLA 172 is a tag control (TC) PLA which provides tags synchronization in accordance with U.S. Pat. No. 3,400,371 with input/output interface 14 and also communicates over interconnections 81 and 96 which are internal to control unit 11. Communications with various elements of control unit 11 from CA 80 are via the external register 118 to MP 110, register 173 which statically stores signals received from and supplied to input/output connections 14 and exchange registers 174, 175 which provide a buffer function with respect to interconnections 81 and 96. The last two PLAs 176 and 177 respectively are for generating status signals (ST), such as supplied during status in time of U.S. Pat. No. 3,400,371, and for internal sequencing (SEQ) of CA 80.

The primary function of CA 80 is to provide communications with a host 12 via input/output interface 14 which includes receiving signals via CBO 16, supplying signals over channel bus in (CBI) 180 and exchanging tag or control signals respectively over channel tag out (CTO) 181 and channel tag in (CTI) 182 cables via register 173. Internal CBO 184 is a logical continuation of CBO 16 extending it to buffer registers 174, 175 and to PLA 177 via AND-OR (AO) circuits 185. PLA 177 is constructed to include the circuit components of channel command decoder 46 which decodes received command codes for use later by microprocessor 110 via logic module CS DCD 329. The A2 input portion of AO 185 is gated by a channel command out CCO signal received over line 17 which is a part of CTO 181. PLA 177 further includes SC flip flop 52. PLA 177 supplies data output signals, such as operation control signals, decoded supervisory command (later described) signals and the like over cable 210 for storage in CAM 170 and for transmittal to other portions of control unit 11 via registers 174, 175 and supplies certain control data signals to host 12 via input/output channel 14. Cable 188 carries address signals for accessing registers within CAM 170. These address signals are generated in PLA 177, PLA 176, or transmitted via PLA 171 as received from microprocessor 110.

CTO 181 is logically connected to an internal CTO bus 190 which extends to registers 174, 175 for exchanging tag control signals with the respective data flow circuits 83 of the two control units 11 and to PLA 172 for synchronization of CA 80 with host 12 tag signals during selection/deselection and status reporting time. It is a usual procedure for a channel adapter 80 to provide tag synchronization with the host 12 during these times while the data flow circuits 83 and other automatic circuits provide a tag sequencing such as SERVICE IN, SERVICE OUT during data transfer times without involving the channel adapter 80 control circuits PLA 172 provides tag derived sequencing and control signals and supplies same over cable 191 to PLA 176 for sending status signals to input/output channel 14. Additionally, it should be understood, because of the complex functions of CA 80, PLA 172 also has additional inputs not pertinent to an understanding of the present invention as indicated by truncated arrow 193 with additional outputs indicated by arrow 192. Similar to the internal CTO 190, CAA 80 has an internal CTI 194 which is connected logically to CTI 182. Registers 174, 175 are connected to internal bus 194 for supplying internal CTI signals from the respective data flow circuits 83 of control units 11.

Bus 196 extending from AO 197 is the internal CBI which is logically connected to CBI 180. Registers 174, 175 also provide signals to internal CBI 196. AO 197 has register 198 for statusizing its output for supplying electrical signals to internal CBI 196. AO 197 receives data signals, which can be control data signals, over cable 199 from CAM 170 via A-1 input portion. In a similar manner the A-2 input portion receives similar signals from PLA 177. Control of AO 197 is via inputs 200 which are derived from tag signals via PLA 172, derived from microprocessor 110 via PLA 177 all in a timed sequence enabling CAA to accomplish the procedures set forth in U.S. Pat. No. 3,400,371.

Registers 174, 175, which connect respectively to the data flow circuits 83 of the control units CU-0 and CU-1, have bi-directional buses 203 and 204, respectively, which are timed and sequenced by tag control signals on bi-directional tag lines 205 and 206. All sequencing is generally in accordance with the teaching of U.S. Pat. No. 3,400,371 and as otherwise well-known in the data processing art. The input and output connections of CAM 170 includes a data bus 210 extending from PLA 171 which is a logical extension of microprocessor 110 buses 120, 121 using external register 118. Other data inputs to CAM 170 are from AO circuits 211 which receive data signals from PLA 171 via A1 input portion as controlled by signals received over line 213 also from PLA 171. Additionally, the A2 input portion gates the signals from bus 187 which carries the signals generated by PLA 177 as gated by the control signals on line 214 from PLA 177. The output signals of AO 211 go over bus 215 to CAM 170. The output signals of CAM 170 are carried over bus 199 to previously described AO circuits 197. Bus 199 also extends to PLA 171 such that its output signals can be relayed to microprocessor 110 via external register 118. Bus 199 also extends to previously described AO circuits 185 wherein the A1 input portion gates bus 199 signals under control of a signal on line 217 received from PLA 177.

For status generation, PLA 176 receives input signals over bus 220 from AO circuit 221. The A1 input portion of AO 221 is controlled by signals on line 222 received from PLA 177 for gating the signals on bus 188 to PLA 176. Additionally, the A2 input portion is gated on by the signals on line 224 received from PLA 177 to gate the signals on bus 223 carried from external register 118. The purpose of this connection is to transfer microprocessor 110 generated status signals to PLA 176. Additionally PLA 176 receives signals over bus 225 from external register 118 which are ordered and controlled by microprocessor 110 and not subject to selective gating by PLA 177. PLA 176 in order to provide all of the interfacing and control status related functions of CA 80 requires connections not pertinent to an understanding of the general operation of CA 80 for the present invention, these additional functions are indicated by the two arrows 226 and 227 respectively indicating additional input outputs of PLA 176.

PLA 177 is the sequence control for CA 80. It includes SC flip flop 52 which has its output line 230 extending from PLA 177 to the input of PLA 176. PLA 176 notes the state of SC flip flop 52 for generating UNIT CHECK status via encoder 236, which is embodied in PLA 176. Additionally LA 176 supplies channel command retry (CCR) signals over line 235 to PLA 172 for relaying to input/output channel 14. Returning to PLA 177, it will be appreciated with all of the elements of CA 80 that sequencing PLAs will have a multitude of connections many of which are not necessary to an understanding of the general arrangement or the present invention. Accordingly arrows 231, 232 respectively indicate additional inputs and outputs of sequence control PLA 177.

PLA 171 has a multitude of connections to microprocessor 110 as indicated by numeral 103, included are address signals exchanged over bus 241 and a clock control set of lines in bus 242, which are beyond the scope of the present description. External register select line 117 extends from local store 144 of FIG. 3 for selecting external register 118 to gate the signals flowing between microprocessor 110 and CA 80. The signals of clock bus 242 are logically extended to internal bus 243 which form an input to PLA 171. Additional connections to external register 118 are via buses 244, 245 which respectively carry REQUEST IN signals to microprocessor 110 as well as data signals. In other words PLA 171 relays signals read from CAM 170 as requested by microprocessor 110 through external register 118.

Shown in CAM 170 are registers which memorize status of the host 12 to system 10 commands. For example, CMD 255 stores the bit pattern received over input/output channel 14 which constitutes the command byte of an input/output command. DADDR register 256 stores the device address immediately preceding the command signals (later described) stored in register 255 and identifies which device 13 is being addressed by host 12. Additionally register 261 is the register storing each of the SC flip flop 52 later described inhibit signals for all of the devices 13. A received MODE SET command can set SC flip flop 52 and simultaneously PLA 177 will transfer that setting bit signal to an assigned bit position of register 261. In this manner, as the plurality of devices 13 are addressed during respective chains and with the chains being interrupted by a channel command retry, CAM 170 memorizes the supervisory control inhibit for all chains that may be interleaving through CA 80 in a multipathing environment such as set forth in U.S. Pat. No. 4,207,609 and as enabled by CCR's set forth in U.S. Pat. No. 3,688,274. Each SC inhibit signal must be transmitted to all members of the path group, this is done via status store 100 of control unit 11 which then sets each of the registers 261 for showing the current supervisory control status for inhibiting supervisory commands in a given chain of commands and which may be multipathed via a plurality of channel adapters 80. Broadcasting and transferring of such control signals between various programmed units is a well known procedure and therefore not detailed in the present description.

Channel adapter 80 detects received commands and end of chain signals and supplies an interruption signal to microprocessor 110 over line 122-6, i.e., level 6 of the interruption scheme as mentioned with respect to FIG. 3. PLA 177 supplies the interruption signal over line 122-6 after decoder DEC 46 has decoded the command. Following this interruption signal, microprocessor 110 accesses channel adapter 80 for fetching the decoded command and any other control data associated with the decoded command. In a similar manner, PLA 172 detects the end of a chain and supplies an interruption signal signifying to microprocessor 110 that the override condition set forth by a previous command within the same chain is to be terminated.

PLA 172 includes a chaining latch 247 (CHN) which indicates a chaining condition for the operation occurring between a host 12 and peripheral system 10. The chaining condition is initiated at the end of the first command of the chain of commands pursuant to OEMI. In this regard AND circuit 248 sets CHN 247 to the active or chaining indicating condition in response to a channel end signal on line 249 generated in the ususal manner, a status end signal received over line 250 and generated in the usual manner and a SUPPRESS OUT signal from host 12 received over line 251 via CTI 181. In a similar manner AND circuit 252 detects the end of a chain for resetting CHN 247 to the inactive condition. Further, AND circuit 252 supplies an interruption signal over line 122-6 to signify to microprocessor 110 that a command level operation is occurring between host 12 and peripheral system 10. AND circuit 252 responds to the lines 249 and 250 signals plus a SUPPRESS OUT=0 signal on line 253 to reset CHN 247. That is, the chaining condition between peripheral system 10 and host 12 is determined at the end of a command execution which is signified at CHANNEL END time and with STATUS IN being supplied over channel togs in 180. Microprocessor 110 utilization of the interruption signal on line 122-6 will become apparent from the continued reading of this specification.

Figure 6:
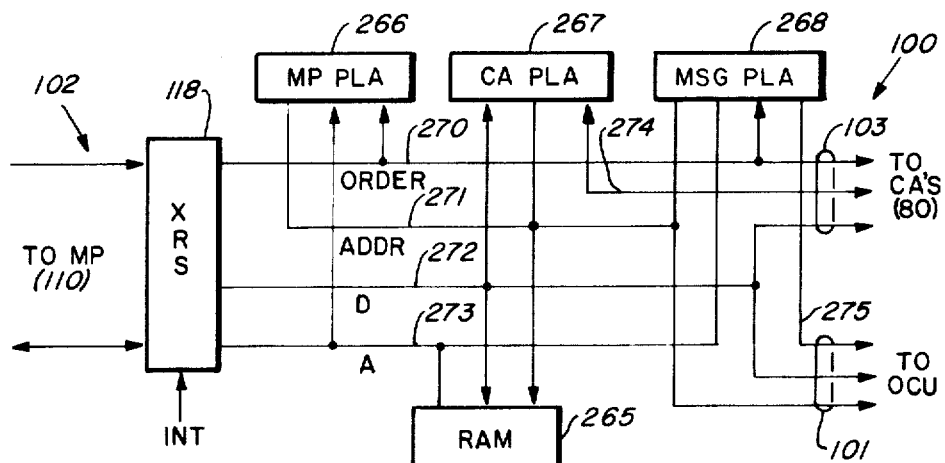
FIG. 6 is a block diagram of a status store usable with the FIG. 2 illustrated peripheral system.

Status store 100 is illustrated in block diagram form in FIG. 6. A primary purpose of status store 100 is to maintain a memorization of the logical status of peripheral system 10. Such memorization includes indications of the access group and the active path groups for all of the devices 13 and channel adapters 80. In addition to such memorization in status store 100, control 33 maintains memorization of additional status indicating signals in control store 111, as will be subsequently described. Coaction of the memorization in status store 100 and the memorization in control store 111 via coordination by microprocessor 110 enables an efficient control of peripheral subsystem 10 in accordance with the present invention.

Random access memory RAM 265 stores various tables of indications of the dynamic logic structure of peripheral system 10. Microprocessor 110 communicates with RAM 265 via external registers 118 which are controlled and accessed as described with respect to FIG. 3. The sequencing and communication aspects of status store 100 are handled through three sets of programmable logic arrays; MP PLA 266 provides communication sequencing and control between microprocessor 110 and status store 110. In a similar manner CA PLA 267 provides supervision and control of communications between the channel adapters 80 and status store 100. Programmable logic array MSG PLS 268 provides a similar function to the other control unit OCU as indicated by cable 101.

The addressing of RAM 265 is provided by address signals supplied over bus 271 from all three PLA's 266, 267 and 268; only one PLA accesses RAM 265 at a given instant. RAM 265 can be time sliced or accessed on any priority basis, the accessing techniques are not important to practicing the present invention. Microprocessor 110 communicates to status store 110 over cable 102, then external registers 118. Microprocessor 110 supplies its orders, similar to commands, over bus 270 to MP PLA 266 which decodes the orders in a usual manner and provides access to RAM 265 for microprocessor 110. Data to be stored in RAM 265 from microprocessor 110 are supplied over so-called "D" bus 272. RAM 265 has preassigned addresses for each function of microprocessor 110. Accordingly, MP PLA 266 can deduce the address of RAM 265 from the received order on bus 270. Microprocessor 110 can also supply address signals through the external register 118 over D bus 272 for general access to RAM 265. Signals read from RAM 265 are supplied over "A" bus 273 to external registers 118 for retransmission to microprocessor 110, to MP PLA 266 and to MSG PLA 268. The orders received on bus 270 can be also transmitted to channel adapters 80 over bus 103. Additionally, CA PLA 267 communicates with channel adapters 80 over bus 274, such communications can follow normal procedures for multiunit data processing interactions. Communications to OCU over cable 101 are controlled by MSG PLA 268 over bus 275. Additionally, buses 271 and 272 extend through cable 101 such that the status store of CU-0 can access the RAM 265 of CU-1; and vice versa. Since the status store 100 is primarily a memory with sequencing primarily indicated for accessing the memory, and such techniques are well known, a further description of status store 100 is dispensed with. Practicing the present invention within the illustrated embodiment required several peripheral commands sendable from hosts 12 to peripheral system 10. These FIG. 7 illustrated peripheral commands are constructed and transferred in accordance with the second document incorporated by reference and as widely practiced in the data processing art. The order of showing the commands in FIG. 7 is arbitrary. The first described command is SNID which enables hosts 12 to sense independent of the access group structures the path group currently existing in peripheral system 10. The command word 276 shows the command as having a device 13 address DADDR followed by the command code CMD and a password PW. Password PW provides the security in peripheral system 10. CMD is a binary code permutation indicating that the command is SNID.

Peripheral system 10 response to SNID 276 by sending a plurality of status information bytes 277. The first portion of the status information 277 is a so-called path state byte PSB. PSB has three sections. The first section DEVGRP defines the group status of the device 13 addressed in SNID 276. DEVGRP can indicate a reset state signifying that no path group command has been accepted by any device 13 in this particular control unit on this channel path, i.e., via the specific channel adapter 80 over which the SNID 276 was received. The reset state will be signified immediately after any power-on reset, system reset which affects the path identified with the channel adaptor during the reset state. Section CA PGID, which identifies the path of which channel adaptor 80 is a member, will be all zeros. As will be later described, all zeros identification can signify that a path group has but one channel adaptor or path as a member. However, the all zero CA PGID combined with the reset state of DEVGRP indicates a non-grouped state for the addressed device 13.

A second status indicated by DEVGRP signifies an ungrouped state. That is, a valid path group identification exists for the channel path over which SNID 276 was received, but the device 13 indicated in DADDR of command 276 has not been instructed by a SET PATH GROUP ID (SHID) command (later described), i.e., the device 13 is not in the grouped state. A third status of DEVGRP is a so-called grouped state in which the channel path is a member of the access group. This indication signifies that a valid SET PATH GROUP ID (SHID) command specifying an establish group function has been accepted over this channel path and for the addressed device. The establish group function is the only way to set the addressed device relative to a channel path into a grouped state. The group may consist of this path or plural channel paths.

A second section of PSB is the allegiance section which signifies the reservation status of the device indicated in DADDR of SNID 276. A first status indicates no allegiance. This means that the addressed device is not currently assigned or a member of an access group. The addressed device 13 owes no allegiance to any host 12. Further, the no allegiance indication signifies that the control unit 11 is unable to determine if the other three later described status states of allegiance apply.

A second status sent in the allegiance section is that the device indicated by DADDR is assigned to another channel path (another channel adaptor 80). This status signifies that the addressed device is assigned but not to the channel path (channel adaptor 80) that received the instant SNID 276 peripheral command. A third status indicated is the assign status. This status signifies that the addressed device 13 is assigned via a later described ASSIGN command to the channel path over which SNID 276 was received. The addressed device 13 may also be assigned to other channel paths as well. The importance of this status is to signify through the instant channel path that access to the addressed device 13 can be achieved. The fourth status is allegiance owed to the issuing host 12. In this regard, the issuing host 12 may have a series of channel programs which will operate with the addressed device 13. The present SNID 276 peripheral command was issued by a given one of those series of channel programs which are executed in channel processors 18. Further, the addressed device 13 may be accessed by the host 12 via other channel paths than the channel paths which receive the instant SNID command 276. Such allegiance can be a so-called contingent connection or implicit allegiance, such as indicated by an outstanding channel command retry, either over the instant channel adaptor 80 or another channel adaptor 80.

A third section of PSB is the PM section which indicates the path mode of the instant channel adaptor 80. A first status is that the channel path is operating in the single path mode. A second status signifies that the instant channel path is operating in a multipath mode, such as described in U.S. Pat. No. 4,207,609. The section CA PGID contains the bit pattern identifying the path group associated with the channel adapter (CA) 80. The PGID in status bytes 277 corresponds to the host ID of U.S. Pat. No. 4,207,609. PW section contains a password corresponding to host 12 indicating the identification of the group to which the addressed device and channel adaptor are members. This will be an access group identification as defined in the present application. It can include a path group in accordance with the allegiance section of PSB, i.e., the same identification signals identify both an access group and a path group.

SHID (set host identification also termed SET PATH GROUP ID) peripheral command 278 activates a path group for a device 13 in a manner similar to that described in U.S. Pat. No. 4,207,609 for its SHID command. There are significant differences between the U.S. Pat. No. 4,207,609 SHID command and the present SHID command, as can be determined by a continued reading. The purposes of the instant channel or peripheral command and that described in said patent are similar in that the identification of a host system is established via a particular channel path (channel adaptor) to a given addressed device 13. Such identification allows the control unit 11 and addressed device 13 to distinguish between host 12 systems for purposes of reconnection via diverse channel paths, all as explained in U.S. Pat. No. 4,207,609. This same identification is used in the access groups via the ASSIGN and UNASSIGN commands to provide device 13 assignments to various host 12 systems. The path group identification capability pertains primarily, but not exclusively, to sharing of peripheral system 10 resources by a plurality of host systems, each of which has a unique identification code pattern.

Each host 12 system generally will specify its path group identification by issuing the command being described to each device 13 that the host 12 intends to use in a given data processing operation. These peripheral commands SHID 278 must be issued along the channel paths that are intended to be used in accessing the addressed device 13. Membership by a device in a path group is only established by issuing SHID peripheral command 278 to that particular device 13. When SHID contains an all zeros identification, then the established path group is limited to one device 13 and a single channel path or adaptor 80. By convention, SHID must not be in a chain of channel command words (CCWs) with any other command else a UNIT CHECK will be sent to the issuing host. This restriction does not apply to the later described ASSIGN command.

When SHID 278 has been issued to a given addressed device 13, until the later described ASSIGN command has been successfully executed for such a device, the device may accept peripheral commands through any channel path within the path group. Reconnection of the device 13 within a path group is as described for U.S. Pat. No. 4,207,609. However, when an ASSIGN command is completed, then the device addressed by the ASSIGN command may perform peripheral operations only with respect to those channel paths specified by such ASSIGN command. This rule applies, except for the sense, SNID, SHID, and CAC peripheral commands. A non-zero identification within SHID 278 establishes a path group identification. The addressed device 13 assumes this identification for multipath reconnection purposes.

The format of SHID 278 includes a first section DADDR which addresses a device 13 for effecting path group control. Section CMD is a bit pattern indicating that the command is an SHID command. Portion FCB, the function control byte, indicates the path modes and other controls. Section PM of FCB defines the path mode. In a first state a single path mode is indicated for the path group that is being established. In this mode, peripheral operations can be initiated over any path within a path group. However, the implicit allegiance that evolves during a peripheral operation has to be maintained for the single path issuing SHID. That is, peripheral commands can be sent to the addressed device 13 over a plurality of channel paths, but reconnection is only to a specified one of the channel paths. When the PM section of FCB is in a second state, then the multipath mode established as in U.S. Pat. No. 4,207,609 is used.

Section F(x) of FCB in SHID 278 describes functions to be performed by peripheral system 10 in executing SHID 278. A first state indicates the establishment of a path group. The device of DADDR in SHID 278 is placed in a so-called grouped state within a path group. The addressed device 13 remains in the path group until a SHID 278 removing it from the active path group is received or until there is a system reset. The addressed device 13 is identified with the activated path group identification that had been signaled to that addressed device via a SHID 278 command. Further, the addressed device 13 is prepared to respond to any selection received over any path identified to that device 13 by the later described ASSIGN command. The path group identification (PGID) is maintained for each path and the logical association of the paths is maintained on an individual device basis.

Devices 13 individually relate to different paths in different path groups. Therefore, using SHID 278 for establishing path groups for all devices attached to a control unit 11, SHID 278 must be issued to and successfully executed for all devices 13 attached to the control unit 11. Further, for path groups SHID 278 must be issued to each device on every channel path via channel adaptors 80 by which the host 12 intends to access such devices.

On the other hand, the later described ASSIGN command provides exclusive use assignment (access groupings) of devices 13 for all the channel paths in one or more path groups. The ASSIGN command is only executed once to assign the addressed device 13 to all paths (channel adaptors) in a path group to create an access group for that device. Multiple ASSIGN commands may add other path groups to any device 13 access group. The SHID command 278 specifying the establish path group function being described can add a new path (additional channel adaptor 80) into an existing access group and its path group. If a given device 13 is assigned to a given access group, then the assignment can be extended by a SHID command to include a newly added channel path. Therefore, it is seen there is a close interaction between SHID 278 and the later described ASSIGN command.

A second function indicated in function control byte FCB is to disband a path group. This function requires peripheral system 10 to disband the path group which contains the path over which the addressed device 13 accepts the SHID 278 command. In other words, each path in the original path group as recognized by the addressed device 13 can receive a SHID 278 command to place the device in the ungrouped state. The path group can still exist for other devices 13 that have not received an SHID 278 command with a disband function. If the addressed device 13 was asigned via the later described ASSIGN command to a path group at the time the SHID 278 disband function was received, then the addressed device 13 remains assigned to the path that issued the disband group code but not to the other members of that path group. Other path groups of the addressed device's access group remain in that access group. If the path over which the SHID 278 was received is not in a grouped state, the SHID 278 disband function is treated as a no operation.

A third function indicated in FCB is the resignation from a path group. This function causes the path over which the addressed device 13 accepts a SHID 278 peripheral command to be removed from one path group to be placed in an ungrouped state. If the device 13 was assigned via the later described ASSIGN command to the path over which the SHID 278 peripheral command was accepted, the assignment remains for the rest of the members of the access group, but the addressed device 13 is removed from the path group.

A PGID is included with each SHID 278. As stated above, an all zeros PGID in a CU 11 indicates a single-path path group, while a non-zero indication identifies a host 12 system. It should be noted that a single central processing unit (CPU) may have a plurality of virtual machines; each of the virtual machines can have a separate PGID. Finally, SHID 278 may have a password portion PW which is used in a normal manner.

Peripheral command control access command (CAC) 279, a supervisory command, enables a host 12 to disregard the access groupings for accessing a device 13 indicated in the DADDR portion of CAC 279. CMD contains the bit pattern identifying the command as a CAC. Portion FAB (function access bytes) has three sections. The first section SP is for transferring password PW in the CAC peripheral command 279 to peripheral system 10. When SP has a first value, then a password is established for the addressed device 13 indicated in the DADDR of CAC 279. If a prior password has been established by a prior CAC command the the two passwords do not match, then a UNIT CHECK error condition will be reported. SP can only be used by a host 12 processor that already possesses assignment of the device 13 indicated in the DADDR portion of CAC 279. If the addressed device 13 is not assigned to the issuing host 12, an error condition is reported. Once a password is established by a CAC command, then that password remains associated with the addressed device 13 and the access group until assignment of the addressed device 13 to any host has been terminated.

A second section TA of FAB portion of CAC 279 relates to a temporary unassignment function and a corresponding temporary assignment. For TA=1, the host 12 issuing the CAC command is instructing that access protection be suspended for all of the commands that follow the CAC 279 within the same chain. Section TM contains a temporary mask to indicate which channel adaptors 80 can be used to communicate with the addressed device. The password PW of CAC 279 must match the password established by a previous CAC peripheral command. If the passwords compare favorably, then the access group limitations are superseded for the command subsequently given in the same chain of commands. When no password PW has been established for the addressed device 13 and a temporary unassignment function is to be performed, then the CAC command is rejected with UNIT CHECk error status. The temporary unassignment function allows the channel adaptor 80 (path) to access an addressed device 13 through that single path group only.

GU in FAB of CAC 279 relates to a general unassign function. Under this general unassign, the device addressed in DADDR is reset to permit access by any and all channel paths via channel adaptor 80. If a password had been set for the addressed device 13 by a prior CAC, then password PW of CAC 279 is compared with the prior password. If the comparison is favorable, then the addressed devices 13 access group is dissolved effective at the end of the CAC 279 command execution. If the passwords do not favorably compare, then UNIT CHECK error status is signaled to the host. If, on the other hand, the general unassign function is commanded and no prior password has been established, then the PW portion of the CAC 279 is ignored. In this situation, the addressed device 13 is unconditionally unassigned from all channel paths that, at that time, may possess assignment of such addressed device 13. UNIT CHECk error status is reported if there is a general unassign with no password and the path carrying the CAC command is not in the access group.

In using the temporary unassignment function TA, a peripheral command following the CAC 279 peripheral command can be the later described ASSIGN command, which in effect, redefines the collection of hosts 12 to which the addressed device 13 is assigned. Such redefinition of access groups can include the issuing hosts 12 which, at the time of the CAC 279 peripheral command is executed, does not have the addressed device 13 assigned to it. However, following this new redefinition, the issuing hosts 12 then can possess assignment of the addressed device 13, i.e., be within an access group with that addressed device. Usage of the later described ASSIGN command, without the CAC 279 peripheral command, provides security of the addressed device 13 usage based upon proper administration of the computing environment of those hosts 12 that hold the assignment, i.e., are members of the access group. In this situation, hosts 12 coming on line in the data processing environment may only enter into the access group when a host 12 that already is a member of the access group grants permission by issuing a later described ASSIGN peripheral command on behalf of a new host 12. The CAC 279 provides greater flexibility through the use of password and path group identification for altering the access groups and path groups without undue communications between the various hosts 12 in the data processing environment. The first hosts 12 that obtain assignment of a given device 13 can choose whether or not to establish a password, thereby indicating a level of security in the data processing network that best suits the hosts 12 users purposes. Of course, other forms of override for access and path group controls may be envisioned within the spirit of the present invention.

Peripheral command UNA 280 is the UNASSIGN peripheral command for unassigning an addressed device 13 or channel path from an access group. If there is no prior assignment of a channel path or addressed device 13 being unassigned, then peripheral system 10 treats the UNASSIGN command as a no operation. If the UNASSIGN command is received over a channel path that is not a member of the access group being affected, an error condition is signaled by peripheral system 10. The UNASSIGN peripheral command is a supervisory type command which can be inhibited as described with respect to FIG. 5. The effect of the UNASSIGN command occurs at the end of command execution, i.e., unassignment of the addressed device 13 from an access group is practically immediate. UNA 280 (FIG. 7) consists of portion DADDR for addressing a device 13, the command code permutations CMD, the path group identification PGID, and, optionally, a password PW.

An important peripheral command in practicing the present invention in the illustrated embodiment is the ASSIGN command AGN 281. The ASSIGN command causes the addressed device 13 to be assigned to specific channel paths in the form of channel adapters 80. Once assigned, a device may only be used via those identified channel adapters, the exception being CAC SENSE, SHID and SNID peripheral commands, which are honored from any path, irrespective of access group memberships. AGN 281 includes portion DADDR identifying the addressed device 13, CMD which identifies the code bit pattern for the ASSIGN command, a PGID section for indicating the group identification and password section PW. If PGID is non-zero, then the identified path group is added to the devices access group. In this instance, peripheral system 10 identifies all channel paths (channel adapters 80) which have been identified to the addressed device 13 as being in the grouped state and possessing the same PGID as received from AGN 281. At the end of AGN 281 command, the addressed device 13 has all of those channel paths identified in the ASSIGN command in its access group. If no channel paths are identified to the addressed device 13 for the access group being established by the ASSIGN command having PGIDs matching that of the PGIDs in AGN 281, then a UNIT CHECK error signal is supplied to command issuing host 12. The PGID contained in AGN 281 does not necessarily have to match the PGID of the channel path (channel adapter 80) over which the ASSIGN command was received. AGN 281 is a supervisory type command subject to the inhibition described with respect to FIG. 5. When AGN 281 PGID is zero, the path group of which the command-carrying path belongs is added to the addressed device's access group.

A plurality of ASSIGN commands may appear in a single chain of commands (channel program). Each ASSIGN command in a chain can identify a new path group to be added to the addressed device 13 access group. Within such a channel program chian of commands, each new ASSIGN command can add to the list of valid channel paths over which the addressed device 13 can be accessed.

In one alternate embodiment, once the chain of peripheral commands is terminated, then the path group assignments go into effect with the addressed device 13 being accessible via all of the indicated channel paths in all path groups identified by the series of peripheral commands AGN 281.

In this alternate embodiment, any UNIT CHECK status occurring within the chain of peripheral commands causes all of the assign requests received during that chain of peripheral commands to be discarded. In other words, the entire chain has to be error free before a supervisory action will be taken by peripheral system 10. This action is taken independent of whether or not the reported error condition is associated with any of the ASSIGN commands. A host 12 instituted interface disconnect given to the channel adaptor transferring the ASSIGN command also will cause all assignment requests from that chain of peripheral commands to be ignored. A newly received ASSIGN command will override all previous ASSIGN commands.

The status of the addressed device 13 is not pertinent to the execution of the ASSIGN command. It can be offline, not ready, or executing a free-standing operation. Access groups established by the ASSIGN command are cleared by power-on resets in the control unit. Access groups are modified or cleared by system resets, or the UNASSIGN command (previously described). A system reset received over a single channel path will unassign from that path all devices having access assignments to that path. The previously described SNID command can reconfigure the path groups and, therefore, reconfigure the member path groups in the various access groups.

The last peripheral command is SMR 282 which suspends multipath reconnection in a path group. That is, a SMR 282 received over a channel path will instruct the control unit 11 to cause all reconnections of the addressed device 13 identified in DADDR of SMR 282 to be reconnected only to the channel path receiving SMR. CMD is the code pattern and PW is the password for limiting the multipathing operation as set up through SHID 278.

Figures 8, 23:
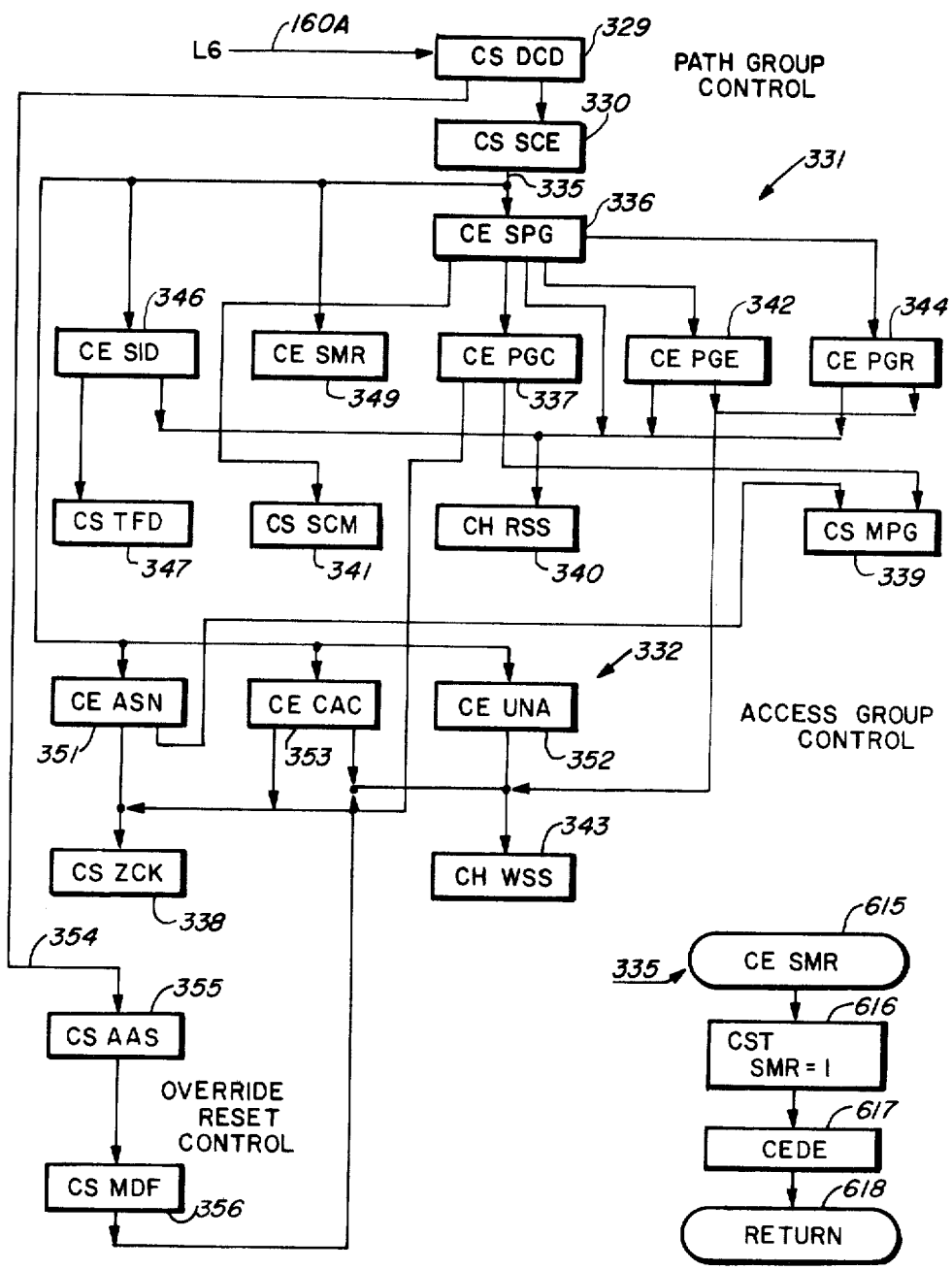
Figure 17:
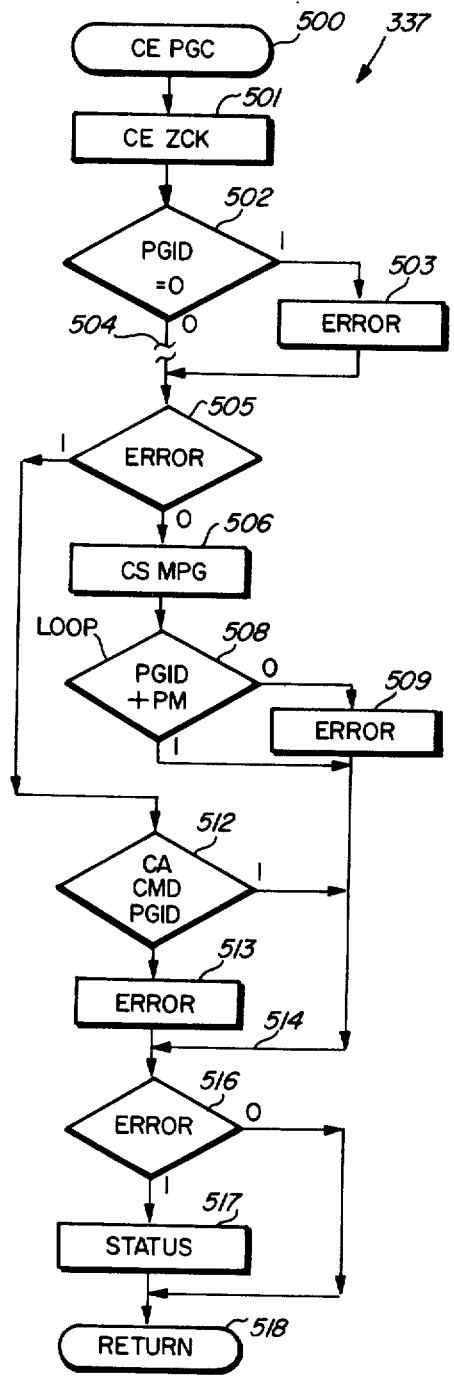
Figure 18:
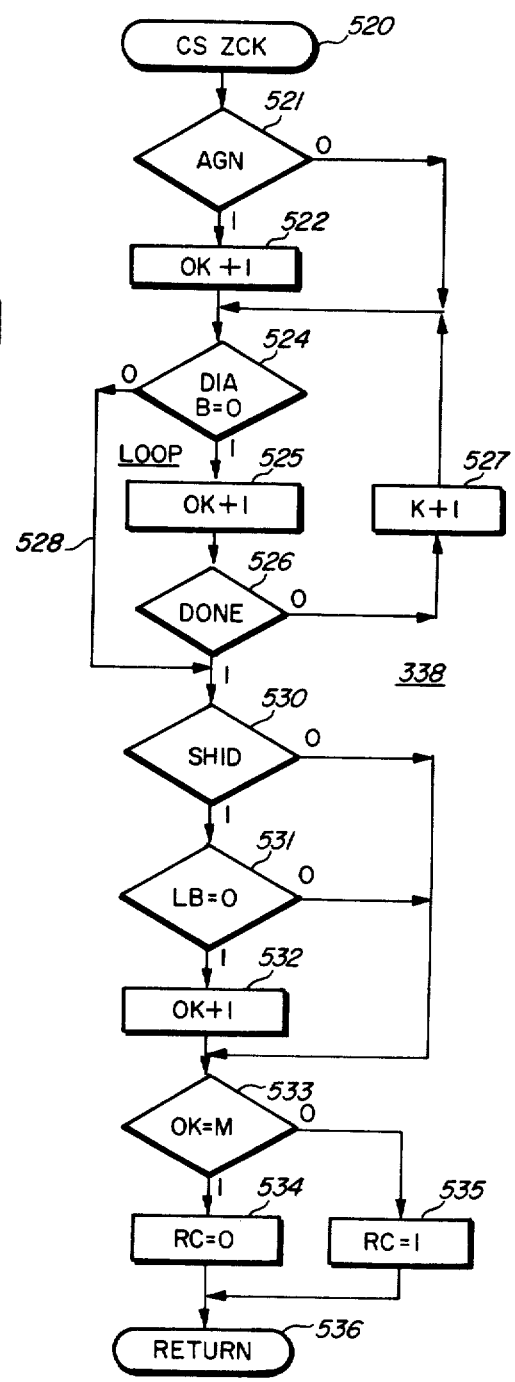
Figure 19:
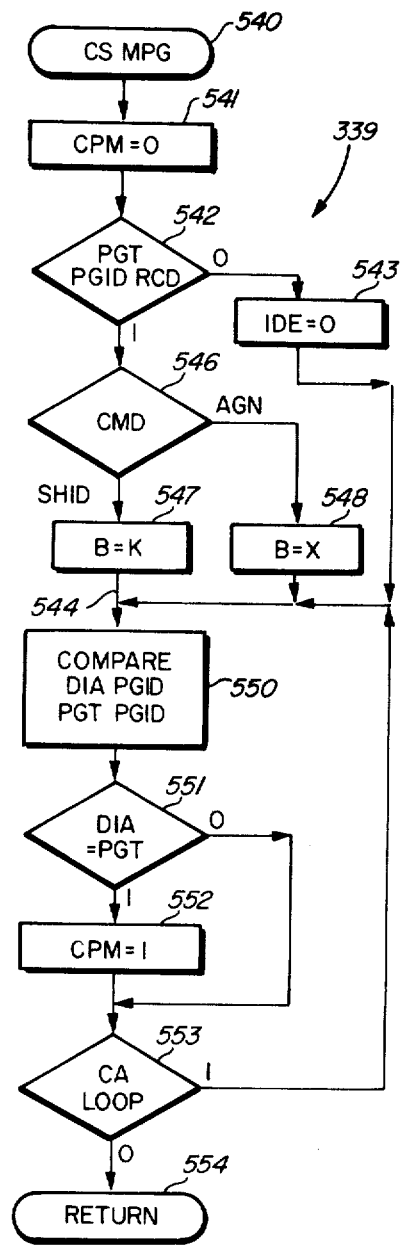

FIG. 8 illustrates the logic structure of control 33 for implementing the present invention in a best mode. This logic structure is activated from a channel adaptor 80 (FIG. 5) supplying a so-called level 6 interruption signal over line 122-6 to microprocessor 110. Microprocessor 110 has the usual idle scan and interruption signal handling microcode, such as is widely practiced in the data processing art. From such an interrupt handler, microprocessor 110 activates the FIG. 8 illustrated logical structure, as indicated by arrow 160A, with a level 6 interruption activation. The first microcode logic module activated is CS DCD 329 (FIG. 14) which decodes received commands from channel adaptor 80 and handles end of chain and other logic functions relating to the initiation of a received command and the termination of an executed received command. For a received command, microprocessor 110 from CS DCD 329 proceeds to CS SCE 330 (FIG. 15) for starting command execution. From this logic module, microprocessor 110 can activate any one of a plurality of logic modules over line 335. The illustrated logic modules are divided into three broad groups. The first consists of path group control logic 331, the second is access group control logic 332, and the third is an override-reset control 333. Path group control 331 has logic module CE SPG 336 (FIG. 16) which responds to the SHID peripheral command. The first function activated from CE SPG 336 is to check the validity of the path group command. In particular, the path group identification (PGID) is checked by CE PGC 337 (FIG. 17). One of the checks is to determine whether or not the received PGID is equal to zero or not. To do this, microprocessor 110 activates logic module CS ZCK 338 (FIG. 18). Another check is to ensure that PGID received with the peripheral command is equal to the PGID stored in peripheral system 10. This is achieved from CE PGC 337 by microprocessor 110 activating logic module CS MPG 339 (FIG. 19). In achieving all the above functions, microprocessor 110 must sense the signal stored in status store 100 which is achieved through logic module CH RSS 340 (not detailed). CH RSS 340 enables microprocessor 110 to access RAM 265 (FIG. 6) of status store 100. Since accessing memories is well known, this logic module is not further described. Microprocessor 110 in executing logic module CE SPG 336 also may send a command message to the other control unit 11. This is achieved through CS SCM 341 which activates status store 100 to cause MSG PLA 268 (FIG. 6) to transfer a message to the other control unit 11. Such a message includes the device address received with the peripheral command, the channel adaptor status which transferred the command to the microprocessor, the received command code and the channel adaptor and receiving adaptor control unit information contained in DIA 139. Such a command message is transferred to the other control unit 11 wherever it has been determined that execution of the received command must involve both control units in executing a single command. Since the transfer of messages is well known in the data processing art, this particular logic module is not further described.

The actual execution of a received SNID peripheral command can be executed by either one of two logic modules. If a path group is to be activated, then microprocessor 110 proceeding from logic module CE SPG 336 goes to logic module CE PGE 342 to perform the group establishment (activation). The functions performed by microprocessor 110 in logic module CE PGE 342 include the execution of logic module CH RSS 340 (previously described) as well as recording new path group active status into RAM 265 of status store 100 by activating logic module CH WSS 343. The function of logic module CH WSS 343 is to record data signals into RAM 265. Since this process is well known in the data processing art, it is not further described.

Figure 20:
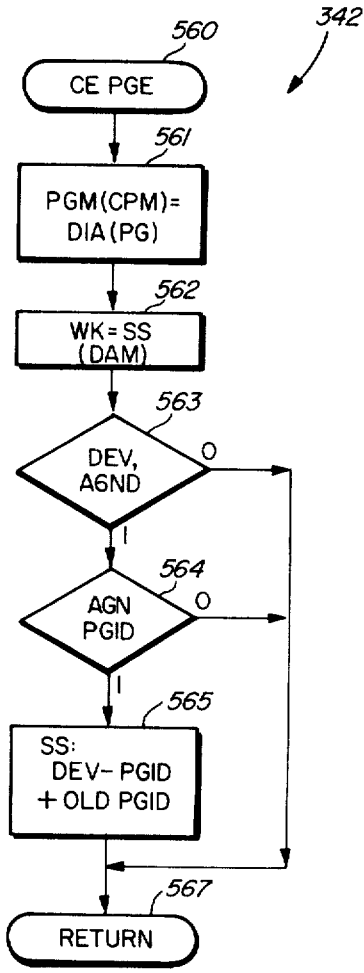

Logic module CE PGE 342 is detailed in FIG. 20. In the event that the received SHID peripheral command is to cause a resign or disband function of a path group, then microprocessor 110 activates logic module CE PGR 344 (FIG. 21) to effect the resignation or disbanding function. Both the previously described logic modules CH RSS 340 and CH WSS 343 are used in executing this function.

The sense path group I.D. command SNID is executed by microprocessor 110 from logic module CS SCE 330. Activating logic module CE SID 346 (FIG. 22) to transfer the stored path group identification (PGID) with respect to the addressed device 13 by reading the path group identification stored in RAM 265 via logic module CH RSS 340, and transferring such PGID to a channel adaptor 80 and host 12. The logic module CS TFD 347 (not detailed) transfers data to the channel adaptor for relaying to host 12 via interface 14. Such functions are well known and not further described for that reason.

The last described logic module for path group control 331 is CE SMR 349 which executes a suspend multitask reconnectior peripheral command. This logic module, illustrated in FIG. 23, sets controls within control unit 11 for preventing multipath reconnections. To do this, later described control tables within control store 111 are accessed with no other access logic modules being involved. The suspension is effected by altering signal contents of the accessed tables.

Figure 26:
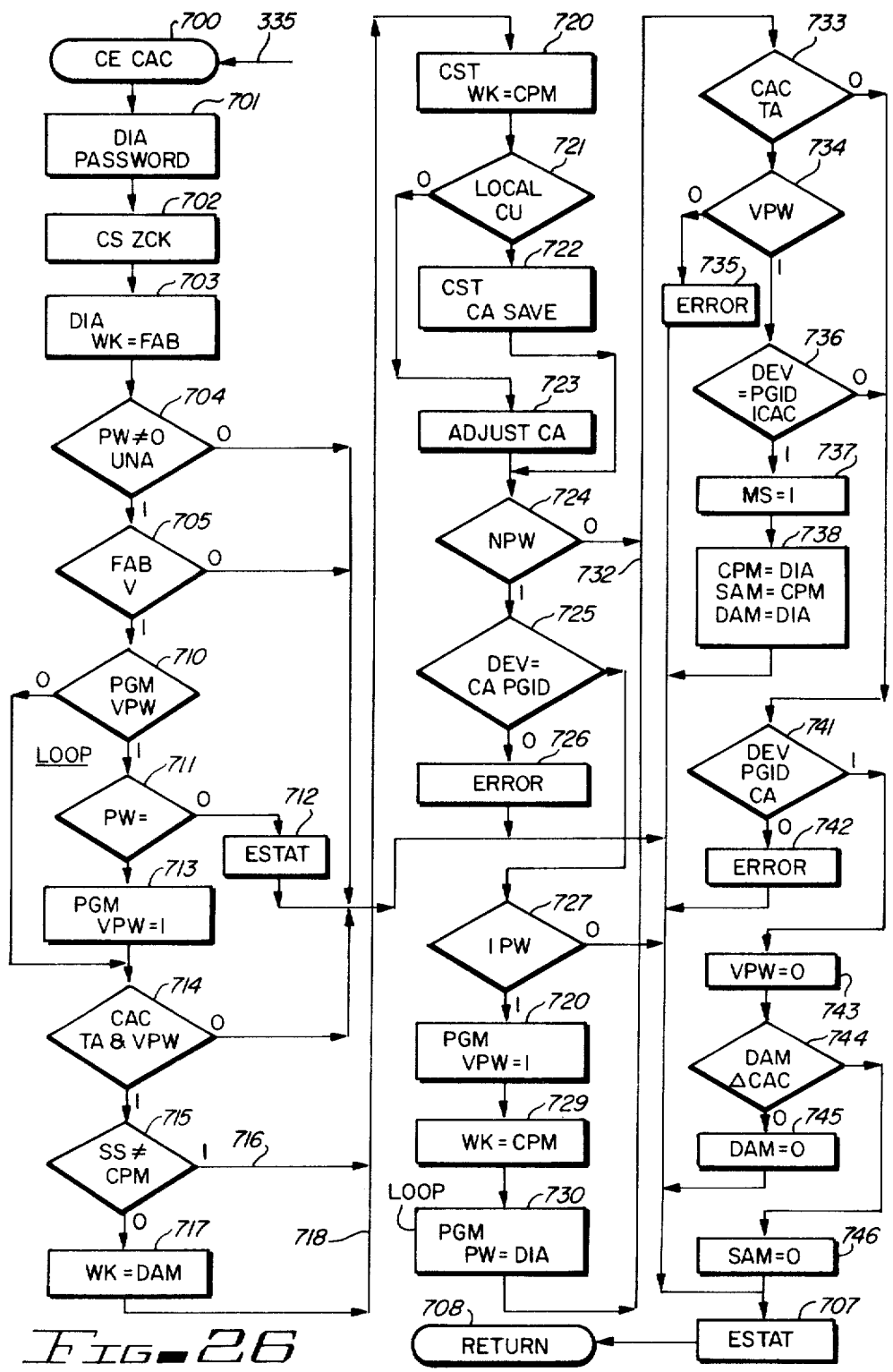

Access group control 332 includes three logic modules for performing three major functions for controlling access groups. It will be remembered that path group control 331 by executing the received SHID peripheral commands can alter membership in the access groups. Logic module CE ASN 351 (FIG. 24) executes the ASSIGN peripheral command. CE ASN 351 activates logic modules CS ZCK 338 and CS MPG 339. The UNASSIGN command is executed by logic module CE UNA 352 (FIG. 25) which accesses data store 100 via logic module CH WSS 343. The control access CAC command is executed by logic module CE CAC 353 (FIG. 26) which activates logic modules CS ZCK 338 and CH WSS 343. All three logic modules 351, 352, and 353 are activated by microprocessor 110 from logic modules CS SCE 330 via line 335.

The override/reset control 333 is activated from logic module CS DCD 329. This is achieved via line 354 activating logic module CS AAS 355 (FIG. 27). Logic module CS AAS 355 analyzes adaptor 80 status which includes detecting the end of chaining conditions as originally signaled by the interruption signal supplied over line 122-6 (FIG. 5). Logic module CS AAS 355 enables microprocessor 110 to activate logic module CS MDF 356 (FIG. 28) for managing the addressed device 13 when in a free state, i.e., after chaining has been discontinued. Microprocessor 110 from CS MDF 356 (FIG. 28) notes the changes in status store of the logic module CH WSS 343. Microprocessor 110 in handling logic module CS MDF 356 terminates both the suspension of multipath reconnection as established by logic module CE SMR 349 and the effects on the access groups as altered or overridden by the logic module CE CAC 353.

Before describing the detail of the logic in the logic modules shown in FIG. 8, the various registers which constitute control tables within control unit 11 and provide continuity between the various logic module operations are first described with respect to FIGS. 9 through 13.

RAM 265 of status store 100 (FIG. 6) has two sets of addressable registers (not shown) directly relateable to implementing the present invention in the illustrated embodiment. FIG. 9 illustrates a path group mask PGM 358, while FIG. 10 illustrates the device access groups in device access map DAM 359. For both sets of registers, the channel paths are identified across the top of the table by the enumeration A through H corresponding to adapters CAA-CAH of FIG. 2. In both FIGS. 9 and 10, the horizontal rows correspond to the addressable registers (not shown) of status store 100. In FIG. 9, each addressable register has a path map portion, a PGID portion and a password portion PW. To identify the PGID for any path (channel adapter 80) or obtain a stored password PW, the path map is scanned for a binary "1" corresponding to a given channel adaptor. Channel adapter CAA, represented in FIG. 9 by "A", is identified with PGID 023 and password P1. Other channel adapter paths are similarly identifiable. Every path group, such as path group 046, need not have a password.

Access to PGM 358 can be directly or via DAM 359 of FIG. 10. For an addressed device 13, the DAM 359 associated access group register is accessed to identify permitted paths. For example, addressing device 0 results in fetching DAM pattern 10011001. If the command was received from CAA 80, it is seen that the "1" bit in the "A" column shows that CAA 80 is a member of the device 0 access group. Then PGM 358 is accessed to obtain the PGID and password PW, as required. When an access group, such as for device "1" has plural path groups, the PGM 358 scan of the path map always results in identifying but one path group.

Three tables of control store (FIG. 4) pertinent for an understanding for practicing the present invention are path group map PGM 146 shown in FIG. 11, path group table POT 147 shown in FIG. 12, and command status table CST 131 shown in FIG. 13. The path group map in FIG. 11 has a plurality of registers, each with a plurality of sections. A first section 360 contains a channel path mark CPM which is set in response to a SHID peripheral command with the function to establish a group as identified in PM section of the FCB portion of SHID 278 (FIG. 7). CPM 360 is also modified by SHID 278 in the resign or disband group function. CPM 360 in each of the control units 11 is affected by the SHID peripheral command 278, received by either control unit CU-0 by the SHID peripheral command 278. That is, the CPM 360 in both control units are identical. SAM 361 stores the access map for the access group that was suspended by a CAC peripheral command 279 for the duration of a chain of peripheral operations. VPW 362 indicates whether or not a valid password was received, i.e., CAC 279 carried a valid password. MS 363 indicates whether or not a mask is stored in SAM 361. This section indicates the receipt of a CAC command and the fact that a chain of peripheral operations associated with the received CAC command is still in force.

PR 364 indicates whether or not a password has been received. The actual password is stored in section 365. Numeral 366 indicates that there are additional registers in PGM 146 that are not shown.

PGT 147 of FIG. 12 is a so-called path group identification table which contains a path group identification for each of the paths or channel adapter 80 connections for both control units, as well as a path group management section which includes status information on the path mode of the respective interfaces, i.e., single path or multipath. PGT 147 also indicates whether a path group identification has been received for the channel adapter 80 with a group number which uniquely identifies any path group identification value received by either of the control units 11 for each of the channel adapters 80. SHID peripheral commands received by either control unit 11 will have an effect on PGT 147. The first section 370 of PGT 147 in each register indicates the channel type. That is, channel processors 18 of hosts 12 may have different characteristics. Section 371 indicates whether or not a path group identification has been received Section 372 indicates when a first portion of a command has been executed in the same manner as later described Section 387 of FIG. 13. Section 373 CU PGID is a reduced size identification for use only within peripheral system 10 for indexing the PGIDs. That is, for an eight channel adapter 80 peripheral system 10, CU PGID 373 is a three bit status section uniquely identifying every path group or ID identification that has been received by the peripheral system. PM 374 indicates the path mode for the particular group. Section 376 indicates the path mode for the particular group. Section 376 contains the actual code bits for the path group identification. Ellipsis 377 indicates additional registers are provided for PGT 147 than shown in FIG. 12.

CST 131 has many diverse indications for accurately reflecting the status of command execution. Only those sections of CST 131 necessary for an understanding of the present invention are described. A first section DADDR 380 contains the address of the device 13 that was addressed by the received peripheral command being executed. The actual command code is stored in section CMD 381. Whether or not multipath reconnection is suspended is indicated in SMR section 382. A channel adapter 80 associated with the received command is set forth in section 383. Which control unit 11 received the command is identified in section 384. The status of the command being executed, i.e., whether a command is still pending (PND) is indicated in section 385. If the channel command retry has been sent in connection with command execution, such fact is reflected in CCR section 386. Section 387 indicates whether or not a first portion of the command execution has been completed. When the section 387 is active, then additional functions have to be performed in the appropriate control unit 11 for completing command execution. Ellipsis 388 indicates that each of the registers contains additional command status information which is not pertinent to an understanding of the present invention. Ellipsis 389 indicates additional registers in command status table 131. In view of interleaving chains due to CCRs, more than 8 register positions can be provided for CST 131.

Figure 14:
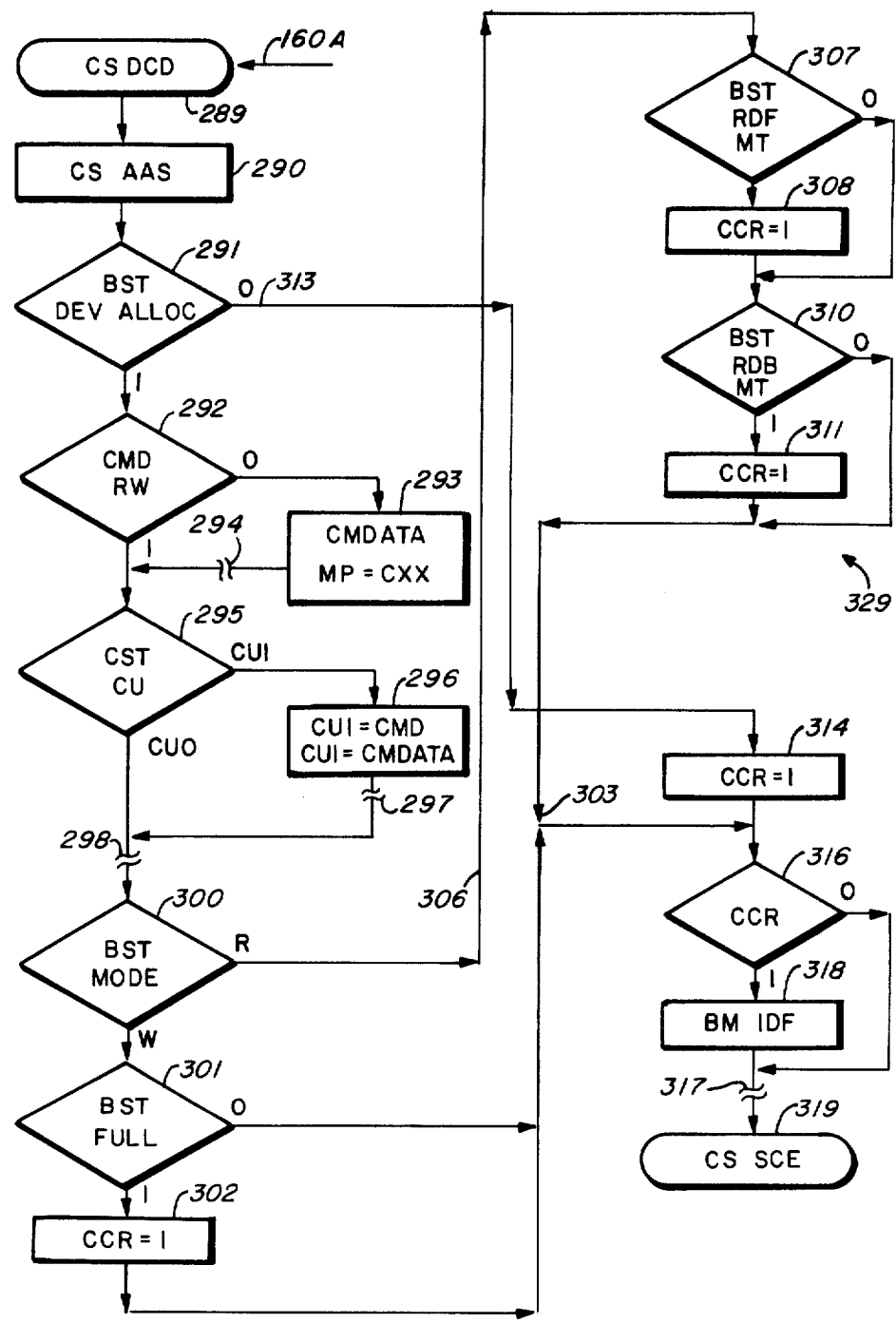

FIG. 14 illustrates microcode logic module CS DCD 329. This logic module is activated at 289 by receiving a command or alternatively by activation internally by microprocessor 110. The first actions at 290 analyze the source of the activation, i.e., whether or not a command related interrupt was received from an adapter 80 or a message received from the other control unit 11 (OCU), the address of the device 13 being addressed (this address is saved in a work register of microprocessor 110) and the command code indicating what is to be performed by storage subsystem 10. These actions occur via logic module CS AAS 355 FIG. 27). After the above-described housekeeping operations have been completed, microprocessor 110 at 291 senses the contents of CST 131 (FIG. 13) to determine whether or not the addressed device 13 has any identified errors or unusual conditions, such as indicated in an error section (not shown) and whether the addressed device has an allocated buffer segment as indicated in BST 137 such that some data processing activity for the addressed device 13 can occur. If the above-listed criteria are met, then at 292 microprocessor 110 examines CMD 381 of CST 131 to determine whether or not the command is a READ or WRITE command. If the received peripheral command is not a READ or WRITE, then at 293 and 294 control data transfer functions are performed; these functions include receiving command data (CMDATA) from a channel adapter 80, such as parameters modifying a logical control command and the like. Numeral 294 indicates that the character of the command and the like is being analyzed. Upon completion of such transfer operations or when the command detected at 292 is a READ or a WRITE command, microprocessor 110 at 295 determines from CST 131 section CU 384 which control unit 11 is to execute the command stored in CMD 381. If the control unit is the other control unit, such as CU-1, then a message concerning the command is transferred to CU-1 status store 100. Such message is transferred at 296 which includes the command data and the command itself. At 297, some housekeeping functions are performed not pertinent to an understanding of the present invention. If the command is to be executed by the local control unit, i.e., CU-0, then no action need be taken. Additional nonpertinent logic steps are performed at 298. At 300, microprocessor 110 reads BST 137 to determine the mode of operation.

All of the remaining steps shown in FIG. 14 relate to detection of a delay in command execution. For example, at 301, microprocessor 110 determines whether or not a buffer 15 segment allocated to the addressed device 13 is full. BST 137, in a section not shown, indicates whther the buffer 15 segment, represented by the entry of BST 137, corresponding to device addresses, is full or empty. If the identified buffer 15 segment is not full, then there is no delay in a write mode. If the identified buffer 15 segment is full in the write mode, then at 302 microprocessor 110 sets channel command retry and reports this delay to channel adaptor 80 for relaying to host 12. From steps 301 and 302 the CCR check exit routine, having steps 316-318, is entered through point 303, as later described.

If, at logic step 300, BST 137 indicates the addressed device 13 is in the read mode, microprocessor 110 follows logic path 306 to check whether or not the buffer 15 segment allocated to the addressed device 13 is empty. This check is achieved in four steps 307-311. First at 307, microprocessor 110 determines whether or not the addressed logical device (device 13 with its allocated buffer 15 segment is a logical device) is in the forward or backward mode as indicated by a direction indicating section (not shown) of BST 137 and examines the buffer segment full or empty section (not shown) of BST 137. If the logical device is in the read forward mode and the buffer 15 segment is empty, then a delay is indicated by microprocessor 110 at 308 by setting CCR to unity and reporting a channel command retry to host 12 via a channel adaptor 80. In a similar manner at 310, microprocessor 110 examines BST 137 entry (not shown) associated with the addressed device 13 to determine whether or not the addressed device is in the read backward mode and empty. If the buffer 15 segment is empty, then at 311 a channel command retry is initiated. Returning momentarily to 291, if the addressed device does not have an allocated buffer 15 segment as indicated by BST 137, then microprocessor 110 follows path 313 to set channel command retry at 314. Microprocessor 110 has now checked all possible conditions in the decoding of commands and receipt of messages from the other control unit 11 which may relate to a command that would result in a buffer causing delay indicated by a channel command retry.

The CCR checking routine having steps 316-318 is entered through point 303. At 316, microprocessor 110 checks whether or not a channel command retry has been instituted by any of the previously described operations. If not, then some "housekeeping" steps are performed at 317, which steps are not pertinent to an understanding of the present invention. If a delay is instituted, then a count field (not shown) in LDT 133 for the addressed device is incremented. This action is achieved by activating logic module BM IDF (not shown) at step 318. The last step at 319 activates logic module CS SCE 330, shown in FIG. 15. Each time microcode logic module CS DCD 323 is activated, CS SCE 330 is also activated.

Figure 15:
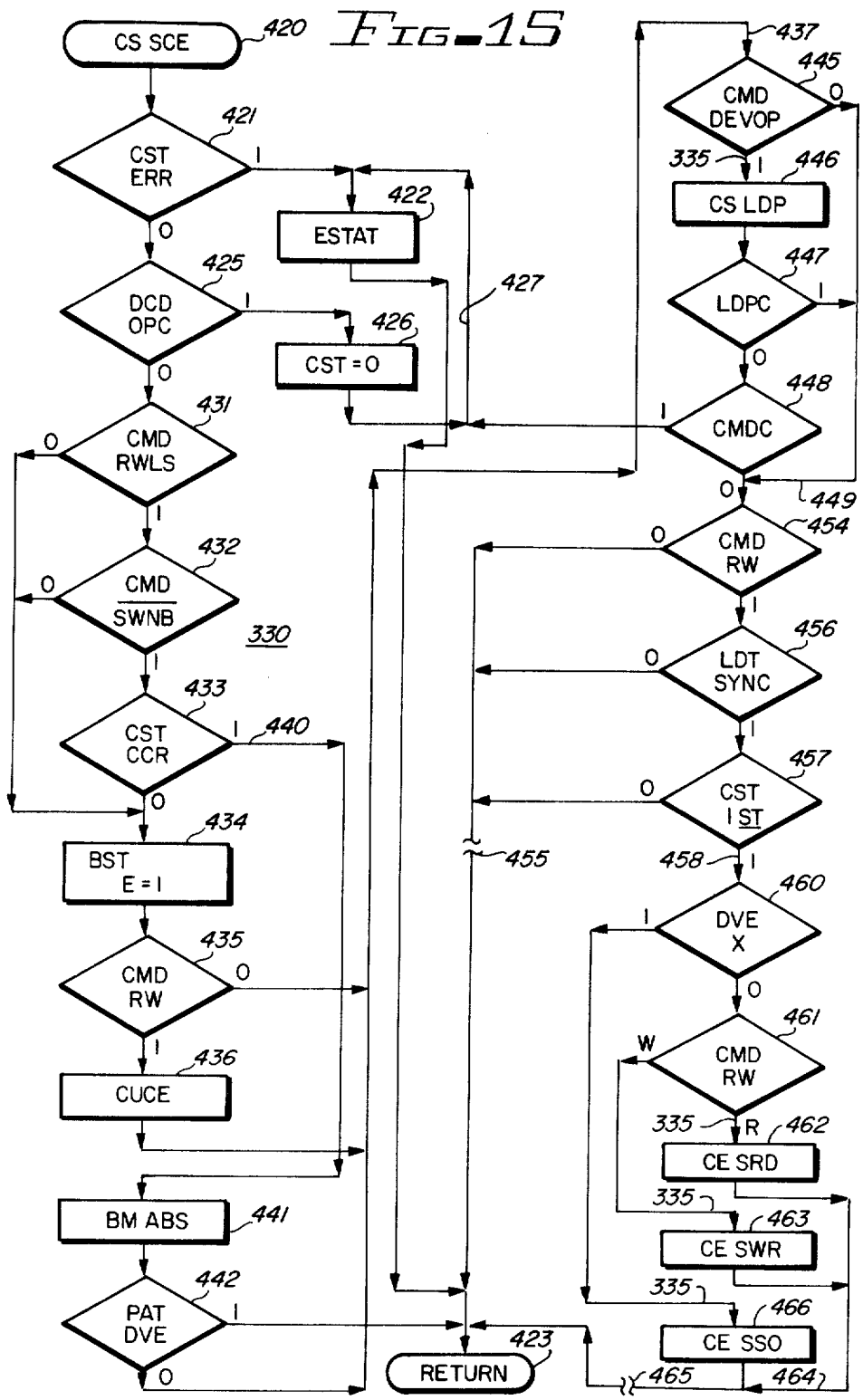

FIG. 15 illustrates logic module CE SCE 330. This module ensures that a buffer 15 segment for the addressed device has been allocated for each command received for a required device function. If the command is a buffer using command, it also initiates buffer and device (logical device) preparation for the command, as appropriate. It also calls the proper command execution logic module of CUCE 152 to execute the command, as will become apparent. This logic module also enables microprocessor 110 to present ending status to the channel 18 via a channel adaptor 80 and adjust the command status table 131 as appropriate; hence this logic module is the initiator and the finisher for each function command execution. Logic module CS SCE 330 is entered after microprocessor 110 has executed logic module CS DCD 329. The logic module begins at 420 whereupon at 421 microprocessor 110 first checks for an error condition in CST 131 such as indicated by an error section (not shown). If an error is indicated, then ending status (ESTAT) is reported to the CNL 18 via a channel adapter 80 at 422. Then microprocessor 110 returns to an activating logic module (such as a scan/interrupt handler—not shown) at 423. Generally an error condition has not occurred, so microprocessor 110 at 425 determines whether or not the operation has been completed (OPC=1) as indicated via logic module CS DCD 329. When the operation has been completed, the register containing the information for the current command in CST 131 is erased at 426. Then microprocessor 110 follows path 427 to report ending status at 422 and returns to the activating logic module at 423. When the operation is not complete (OPC=0), microprocessor 110 at 431 and 432 analyzes the received command. At 431 microprocessor 110 determines whether or not the received command is a READ (either forward or backward direction), WRITE, LOCATE BLOCK, READ DATA BUFFER, SENSE or a SYNCHRONIZE command. If the command is any one of the above, then at 432, microprocessor 110 determines that the command is not one of the following commands: REWIND, READ DATA BUFFER, a SYNCHRONIZE, a SPACE BLOCK command. The effect of analysis of steps 431 and 432 identifies those commands that will have to use buffer 15. For these commands microprocessor 110 will verify whether or not a buffer 15 segment has been allocated. But first, at 433, microprocessor 110 checks CST 131 section 386 to determine whether or not a CCR has been sent to a host 12 for this specific command as such would be required by buffer conditions. If the received command identified in steps 431 and 432 is not CCR'd or the command is other than those identified in the logic of steps 431 and 432, then at 434 microprocessor 110 accesses BST 137 to set an E field (not shown) to unity for indicating that the buffer 15 segment for the addressed device is engaged, i.e., the command is about to be executed and therefore the buffer 15 segment is busy. Then, microprocessor 110 at 435 determines whether the command is either a READ or a WRITE. For a READ or WRITE command, microprocessor 110 at 436 activates a command execution logic module within group CUCE 152 as indicated by line 335 of FIG. 8. The logic module activated is a function of the command identified in section 38 of CST 131. From steps 435 and 436 microprocessor 110 follows line 437 to execute a series of steps, as will be later described.

Returning to 433, if CST 131 had indicated a CCR had been given for the instant command, microprocessor 110 follows line 440 to allocate a buffer 15 segment by activating logic module BM ABS (not shown) at 441. Microprocessor 110 in following logic module BM ABS will allocate a buffer 15 segment to the addressed logical device for performing the instant command. Following a return from that logic module, microprocessor 110 at 442 determines from PAT 134 whether or not a buffer 15 segment has been scheduled for allocation to the addressed device. This information can also be provided by a so-called "return code" stored in a predetermined work register (not shown) of microprocessor 110 developed by BM ABS (not shown)

which indicates that PAT 134 has received a request for allocation for the addressed device. If all of this activity is successful, microprocessor 110 returns at 423 awaiting the actual allocation and other activities that must occur before command execution can proceed. On the other hand, if there was an allocation already in hand, then the command execution can proceed. Therefore, microprocessor 110 from 442 proceeds along line 437 to execute the following steps:

At 445 microprocessor 110 determines whether or not a device 13 operation will be required to execute the instant command. If this is the case, a logical device must be prepared via line 335 (corresponding to line 335 of FIG. 8) to activate at 446 logic module CS LDP (not shown). Following microprocessor 110 executing CS LDP, microprocessor 110 at 447 checks whether or not the logical device preparation has been completed (LDPC). If preparation was not completed, microprocessor 110 at 448 checks to see whether or not the command execution is complete (CMDC). If CMDC=1, ending status is reported at 422, as previously described. On the other hand, at 447 if preparation of the logical device is complete (LDPC=1) or at 448 the command execution is incomplete (CMDC=0) or at 445 it is not a device operation (DEVOP=0), microprocessor 110 proceeds over line 449 to step 454 to see if the command is a READ or a WRITE command. If it is not either of those two commands, then some nonpertinent logic functions are performed at 455 and microprocessor 110 will then return to an activating logic module at 423. If the received command is a READ or WRITE command, microprocessor 110 at 456 checks to see whether or not a so-called tape synchronous mode (read or write) of operation is indicated in LDT 133. If the mode is not the tape synchronous mode, the non-pertinent logic steps 455 are executed; otherwise microprocessor 110 proceeds to 457 to examine CST 131 for a first pass indication 387 of execution of the received command. If it is not the first pass, then nonpertinent logic steps 455 are performed; otherwise microprocessor 110 follows path 458 to logic step 460 to determine if the addressed device 13 has been held for the instant command (DVE X). If the addressed device has been held (DVE X=1), then, remembering that the tape synchronous mode was indicated at 456, a tape synchronous operation can ensue. However, if the addressed device is not being held for the instant command (DVE X=0), then the tape synchronous operation mode must be set up between the control unit 11 and the addressed device 13. To do this, microprocessor 110 at 461 determines whether the command is a READ or a WRITE. If it is a READ command, then at 462 microprocessor 110 goes to logic module CE SRD (not shown) for setting up the tape synchronous mode (read) within subsystem 10 for the addressed device. In the write mode, microprocessor 110 proceeds from 461 via 335 to logic module CE SWR (not shown) at 463. After executing either one of these logic modules, microprocessors 110 follows path 464 to perform some non-pertinent logic functions at 465 and then goes to return 423. The synchronous mode means both device 13 and host 12 are simultaneously transferring data with buffer 15; the host 12 input-output operation is directed to the addressed device 13.

On the other hand, if the addressed device has been held (DVE X=1) then steps 462 and 463 will have already been completed. The tape synchronous mode then can be initiated for executing the received instant command. Accordingly, microprocessor 110 from 460 proceeds via logic module 335 to 466 which activates logic module CE SSO (not shown) which actually initiates transfer of data signals between a device 13 and a control unit 11 set up by either of logic modules CE SRD or CE SWR. Path 464 leads from steps 462, 463 to step 465.

At this point in the processing of a received command, microprocessor 110 of control unit 11 has decoded the command, determined the status of the peripheral system 10 and either is in the process of preparing the peripheral system to actually execute the command or has initiated execution via one of the command execution logic modules.

Once a CCR has been sent by peripheral system 10 to a host 12, system 10 signifies to host 12 by a DEVICE END signal that preparatory steps necessary for executing the CCR'd command have been met. Then the host 12 will reissue the input/output command to the peripheral system. Accordingly, when a command has been received and is being analyzed by CS DCD 329 and CS SCE 330 in preparation for execution or a READ, READ BACKWARD, or WRITE command and was previously CCR'd due to improper buffer 15 conditions (empty or full), then the microprocessor 110 executes logic modules CS LDP and CS LDC (not shown) to prepare the logical device for the operations.

Figure 16:
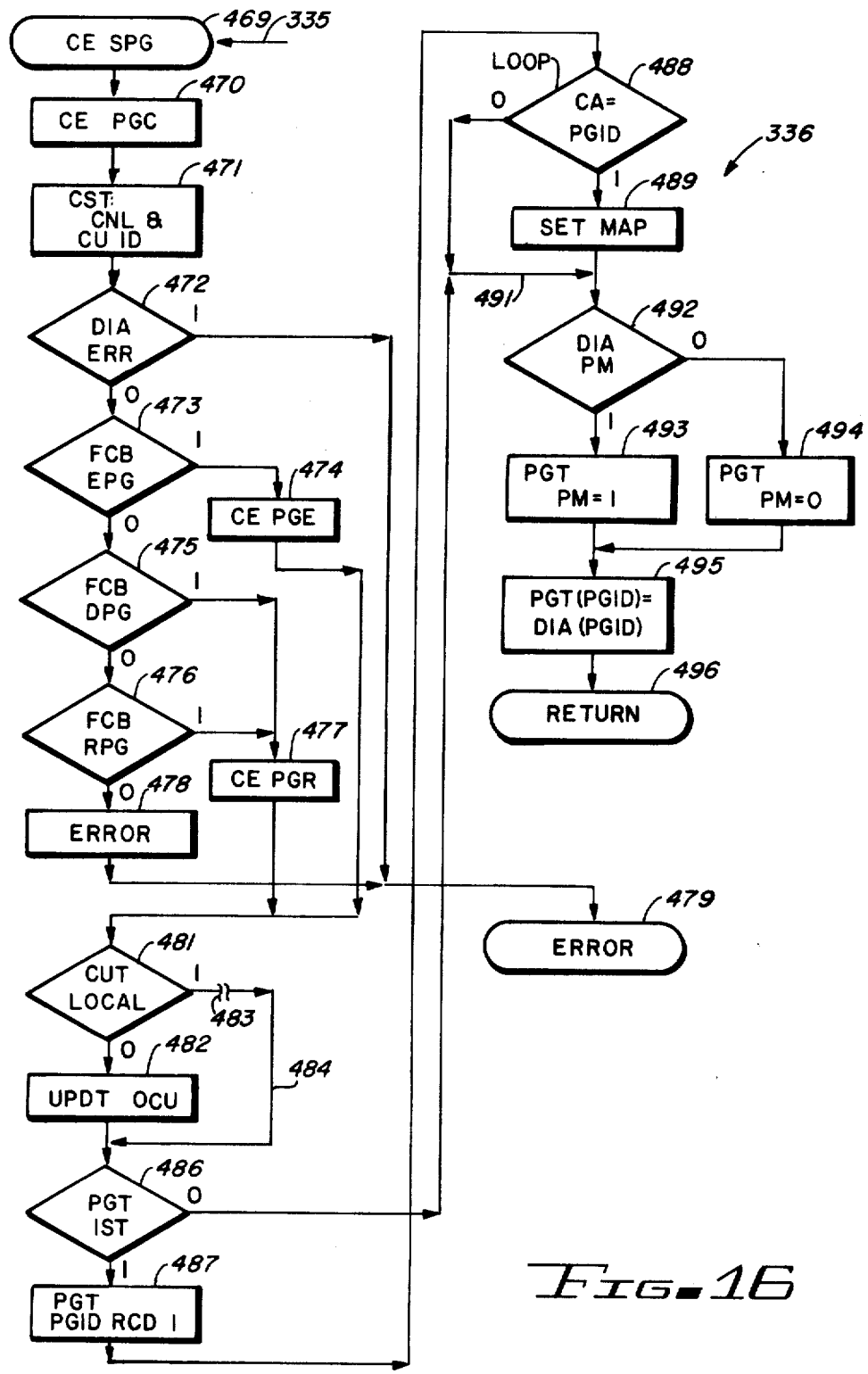

FIG. 16 details logic module CE SPG 336. The module begins at 469 with activation represented by line 335 such as shown in FIG. 8. First, at 470 logic module CE PGC 337 (FIG. 17) is activated to verify PGID. At 471 microprocessor 110 transfers the channel and control unit identification to CST 131. This action memorizes within control store 111 for control 33, which channel adaptor 80 received the peripheral command and the identification of the control unit 11 which will execute the received peripheral command. At 472 microprocessor 110 checks DIA 139 (FIG. 4) for device 13 errors. The errors of course would relate to the addressed device 13. If there is an error condition, then error exit 479 is followed for instituting error recovery procedures beyond the scope of the present description. Without an error condition, microprocessor 110 at 473 examines the FCB portion of SHID 278 (FIG. 7). If FCB indicates establishment of a path group (EPG), then at 474 logic module CE PGE 342 (FIG. 20) is activated. If FCB indicates other than a group establishment, then the command is either a disband or a resign. Accordingly, at 475 FCB is examined to see if it is a disband path group (DPG). Also, at 476, microprocessor 110 examines FCB for a resign path group function. If either of these conditions are met, at 477 logic module CE PGR 344 (FIG. 21) is activated. That single logic module handles both resignations from and disbandenment of path groups. If none of the functions examined in 473, 475 or 476 were found, an error condition is signaled at 478 with exit being taken at 479 to an error recovery and reporting procedure (not described).

From either logic module CE PGE 342 or CE PGR 344, microprocessor 110 follows logic path 480 to determine if the control unit 11 which will execute the command is local or remote. At 481, table CUT 130 is examined for determining which control unit is to execute the command. If it is the remote control unit, then at 482 the other control unit OCU is updated (UPDT) by supplying a message containing the received peripheral command along with its associated control data through status store 100 and cable 101 to OCU. If the local control unit is to execute the command, than at 483 some non-pertinent logic steps are performed. In either event, microprocessor 110 follows logic path 484 to examine PGT 147 at 486. Section 372 is accessed to determine whether or not the received SHID peripheral command is the first one received over the channel path (channel adaptor 80). If the peripheral command is not the first SHID, then path 491 is followed to perform later described steps. On the other hand, if it is the first SHID peripheral command received over the channel path, at 487 microprocessor 110 sets the PGID RCD section 371 of PGT 147 (FIG. 12) to unity to indicate that a path group identification has been received. Then at 488 microprocessor 110 finds any other channel adaptors 80 that may have an equal path group identification (CA=PGID). This logic step is a loop of instructions that scan PGT 147 sections 376 (FIG. 12). If no other channel adaptor has the same PGID, then logic path 491 is followed. Otherwise, at 489 the group maps of status store 10 shown in FIGS. 8 and 9 are updated as described for those figures. At 492, microprocessor 110 accesses DIA 139 to examine the received PM section of FCB within SHID 278 (FIG. 7). It should be noted that the interruption signals from channel adaptor 80 supplied over line 122-6 activate the interrupt handler which transfers the data received from the host 12 into DIA 139. Since such transfer follows normal interruption handling procedures, it is not described. Depending upon the value of PM in DIA 139, the PM section 374 of PGT 147 relating to the PGID is updated to reflect the commanded path mode in PGT 147, respectively, by logic steps 493 or 494. Then at 495, microprocessor 110 transfers the value of PGID contained in DIA 139 to the section 376 of PGT 147. Finally, at 496 the microprocessor 110 returns to CS SCE 330.

FIG. 17 illustrates logic module CE PGC 337 which is activated from step 470 of CE SPG 336. Such activation is represented in FIG. 17 at 500. The first action that occurs activates another logic module, CE ZCK 338 at 501 for determining whether or not the received PGID stored in DIA 139 is zero. If it is zero, from logic step 502 microprocessor 110 indicates an error condition at 503. If it is non-zero, then some non-pertinent logic steps are performed at 504. At 505, the error is checked by microprocessor 110. If an error is indicated at 503, then microprocessor 110 goes to step 512 later described. If no error was indicated at 505, then at 506 microprocessor 110 activates logic module CS MPG 339, shown in FIG. 19. This logic module matches the PGID contained in DIA 139 with the PGID in PGT 147. At 508 microprocessor 110 scans the PM sections 374 PGT 147 for ensuring that all registers containing an identical PGID to the received PGID have the same path mode. If there is an inequality (different path modes), an error is indicated at 509. All devices in one path group must be in the same path mode.

From step 505, microprocessor 110 at 512 checks the PGID of the channel adaptor 80 which received the command CMD. If the PGID's of the received command and the stored PGID are unequal, then an error is set at 513. Otherwise, path 514 is followed to 516 for checking whether or not an error was tagged at either 509 or 513. If an error was tagged, at 517 ending status including error status is supplied to an appropriate portion of control store 111 for reporting to host 12 along with a UNIT CHECK signal. Return to the activating module is made at 518.

FIG. 18 illustrates logic module CS ZCK 338 as activated by several logic modules described elsewhere. Entry at 520 results in transfer of the ancillary control data PGID of SHID 278, PW of CAC 279, or the PGID fields of ASSIGN command 281 and UNASSIGN command 280 from DIA 139 to work registers (not shown) in microprocessor 110. Since the number of bytes in the identifications for an ASSIGN command is different than a SHID command, for an ASSIGN command at 521, the value of the byte counter (OK) counting the bytes being transferred that are equal to zero is set 522 to a preset value plus one. In other words, byte one (the second byte) is treated as the first byte (byte zero). At 524, the transfer of the bytes from DIA 139 to the microprocessor 110 work registers is checked for the byte count "B" equal to zero. A loop of instructions 523 transfers the bytes to work registers (not shown) within microprocessor 110. The byte counters are respectively incremented at 525 and 527 using known techniques. When the byte in DIA 139 is not zero, path 528 is followed. When a received byte is zero, the zero counter is incremented at 525. For leaving the loop 523, microprocessor 110 at 526 examines whether or not all the bytes have been transferred. When all the bytes are transferred, microprocessor determines, at 530, if it is a SHID command. If not, the zero counter (not shown) is not incremented at 532. Similarly, for a load balance (LB) operation (which transfers devices between control units 11) is checked at 531. If the operation is a load balance, then the number of bytes transferred is less requiring the zero counter to be incremented at 532. Finally at 533, microprocessor 110 enters a loop for determining the number of bytes that are all zeros. If the zero counter was equal to M from the loop 523 examining the bytes equal to zero, a return code RC is set to zero at 534. If the zero counter is not equal to M at 533, the return code RC is set to unity at 535. The activating module is returned to at 536. The return code uniquely identifies whether or not the received PGID is all zeros or any other received value.

FIG. 19 details logic module CS MPG 339. This logic module enables microprocessor 110 to match the received path group identification with the currently stored path group identification within storage system 10 for the channel path over which the SHID command or other related command has been received. Entry from the activating logic module is at 540. Then at 541 field CPM 360 of PGM 146 is reset to zero. At 542 microprocessor 110 examines PGT 147 section PGID RCD 371 to see if a PGID has been received. If none has been received, then the identification equivalence flag (not shown but residing in microprocessor 110) IDE is reset at 543. The microprocessor 110 proceeds to the identification equivalence check point 544. If PGID RCD=1 at 542, then at 546 microprocessor 110 determines whether the command in DIA 139 is an ASSIGN or a SHID command. The two commands have a different length of control data. Accordingly, a byte counter for transferring the bytes from DIA 139 into microprocessor 110 works registers (not shown) are set respectively equal to K or X, at 547, 548 for the two commands. Next, microprocessor 110 proceeds through identification equavalence checkpoint 544 to compare the PGID in DIA 139 with the PGID in the PGT 147 at 550. After the compare, microprocessor 110 at 551 senses whether or not the comparison was favorable. If it is favorable, then CPM 360 of PGM 146 is set to unity to indicate the corresponding PGID 376 of PGT 147 is valid. At 553, microprocessor 110 determines whether or not steps 550 through 552 were performed once for each channel adaptor 80. This is provided by a "do loop" which is monitored by step 553 to ensure that a comparison is made for each of the channel adaptors 80. Accordingly, CPM has eight bit positions—one for each channel adaptor, which becomes the mask for the path group being established. That is, each channel adaptor register in PGT 149 having a PGID 376 equal to the DIA 139 PGID receives a one in the CPM 360 portion of PGM for their respective channel adaptor. Upon completion of the 8 position loop, microprocessor 110 returns via 554 to the activating logic module.

FIG. 20 illustrates logic module CE PGE 342. This logic module 342 is activated from CE SPG 336. Entry at 560 is followed by setting PGM 146 CPM section 360 at 561 equal to the path group contained in DIA 139. This makes the current mask in PGM 146 for the channel adaptor receiving SHID peripheral command to the commanded path group. At 562, the appropriate DAM 359 signals from status store 100 are transferred via logic module CS RSS 340 into work registers (not shown) of microprocessor 110. Then at 563, microprocessor 110 determines whether or not the device addressed in SHID 278 is already assigned. If it is not assigned, no further checking is required and microprocessor 110 returns at 567 to the activating logic module. If it is assigned, than at 564 microprocessor 110 determines if one of the channel paths has assignment of the addressed device 13 and has the same path group identification as the channel path that issued the command and is grouped. Then logic module CH WSS 343 is activated at 565. This activation writes in status store 100 that the device addressed in the SHID peripheral command is in the path group that issued the command as well as other access groups that already have assignment of the addressed device. Some error checking (not shown) occurs not pertinent to the understanding of the present invention. Then at 567 microprocessor 110 returns to the activating logic module.

Figure 21:
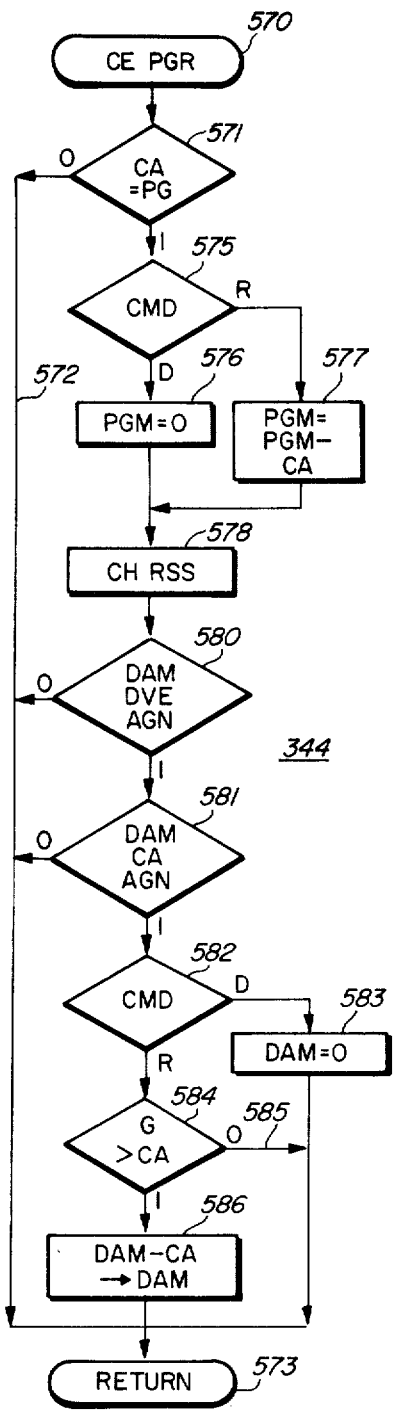

FIG. 21 illustrates logic module CE PGR 344 which handles resignations and disbandonment of path groups that were established via logic module CE PGE 343. Activation of logic module CE PGR 344 from logic module CE SPG 336 is at 570. First microprocessor 110 checks whether or not the channel adaptor 80 that received the SHID peripheral command is a member of the path group. That is, unless the channel adaptor 80 is designated as a portion of the path group it cannot perform any resignation or disband function for the path group. If the receiving channel adaptor 80 is not a member of the path group, then the received command is treated as a no operation. This is achieved by microprocessor 110 following path 572 to return to the activating module at 573. On the other hand, when channel adaptor 80 is a member of the path group, then at 575 microprocessor 110 determines whether the commanded function of SHID is a resign (R) or a disband (D). If it is a disband function, then at 576 microprocessor 110 resets PGM 146 that relates to the channel adaptor receiving the SHID peripheral command. If it is a resign, than at 577 the identification of the channel adaptor 80 receiving the SHID command is eliminated by altering CPM 360. This action merely is a masking operation such that the receiving channel adaptor is removed from the mask. Following steps 576 or 577, microprocessor 110 at 578 activates logic module CH RSS 340 to transfer contents of DAM 359 relating to the receiving channel adaptor 80 to work registers (not shown) of microprocessor 110. Then at 580, microprocessor 110 examines the contents of DAM 359 to see if the addressed device 13 indicated in DADDR portion of SHID command 278 (FIG. 7) is assigned to the group. If the device 13 is not so assigned, return is made, making the operation a no operation. If the device addressed is assigned, than at 581 microprocessor 110 determines whether or not the channel adaptor 80 receiving the SHID command is a member of the access group. If it is not, return is made at 573. If the channel adaptor is a member of the access group, then at 582 the character of the command is given re-examined. For a disband, all of the entries related to the channel adaptor 80 are reset at 583. If, for a resign function, microprocessor 110 at 584 determines whether or not the access group has more members than the receiving channel adaptor. If it does, then no action can be taken because all of the assigned devices 13 still can be accessed through the remaining path members of the access group. Accordingly, at 586, the designation of the receiving channel adaptor 80 is removed from the DAM 359 mask to effect a resignation. On the other hand, if the receiving channel adaptor is the only path available to the assigned device remaining in the access group, microprocessor 110 follows path 585 to avoid deleting the receiving single remaining path from the access group. Return is then made at 573.

Figure 22:
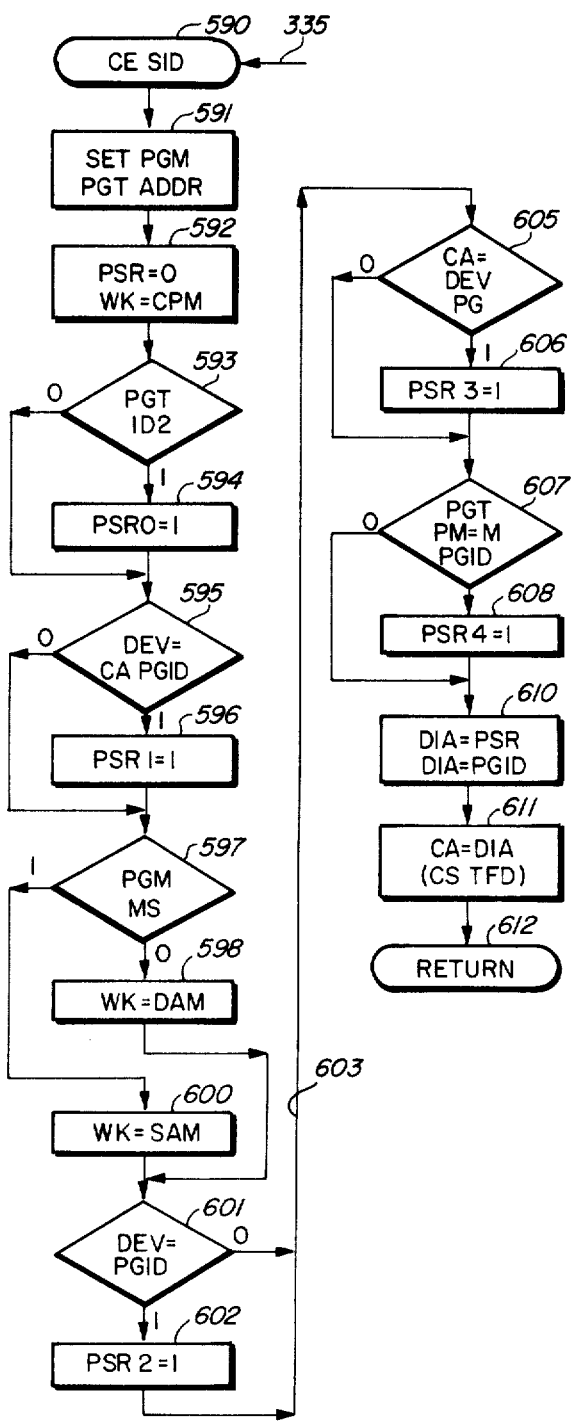

FIG. 22 details logic module CE SID 346 which is activated via line 335 from CS SCE 330. Entry is at 590. First the addresses of PGM 146 and PGT 147 are set for accessing those two tables. At 592 a path state register PSR (not shown) in microprocessor 110 is set to zero. A work register (not shown) in microprocessor 110 is made equal to the contents of CPM 360 of PGM 146. At 593, PGID RCD 371 of PGT 147 is examined. If an identification signal PGID has been received, then bit zero of PSR (not shown) is set to unity at 594. Then at 595, microprocessor 110 determines whether or not the addressed device 13 indicated by DADDR section of SNID 276 (FIG. 7) is a member of the path group that includes the receiving channel adaptor 80. If the addressed device 13 and the receiving channel adaptor 80 are of the same path group, then bit one of PSR is set to unity at 596. At 597, PGM 146 MS section 363 is examined to see if a mask has been stored in SAM 361. This means a channel access command with a temporary assignment has been received for the channel adaptor. If that is the case, then the contents of DAM 359 are transferred to a work register (not shown) within microprocessor 110 as at 598. The mask is stored; then the contents of SAM 361 are transferred to work registers (not shown) in microprocessor at 600. The transfers at 598 and 600 accumulate the mask information for transferring to the host that issued the SNID peripheral command. The peripheral system 10 does not report the mask set up by a CAC command, but rather one that was set up by a SHID peripheral command.

At 601, microprocessor 110 examines the above-mentioned work registers to see if the device addressed in the SNID peripheral command is a member of the path group. If it is, at 602 the second bit of PSR is set to unity. Then, following path 603, microprocessor 110 at 605 determines whether or not the receiving channel adaptor is a member of the path group. If so, at 606 PSR bit three is set to unity. Then at 607, PGT 147 PM section 374 is examined to determine if multipathing is the path mode and the PGID's compare. If this is the case, than at 608 the fourth bit of PSR is set to unity. Finally, at 610, the contents of PSR, a work register (not shown in microprocessor 110, are transferred to DIA 139 along with PGID. From DIA 139, the status information, including the PGID is transferred to the channel adaptor at 611. This action completes the microprocessor 110 involvement in the sense command. The channel adaptor 80 then transfers the status information to host 12 in a usual manner. Return to the activating module CS SCE 330 is made at 612. Please note that a regular sense command will sense status information not relating necessarily to the logical structure of the peripheral system 10 including the path groups and access groups. Either sense command will be responded to, irrespective of membership of the addressed device in any path or access group.

FIG. 23 details execution of the suspend multipath reconnection command SMR 282 by logic module CE SMR 349. All this amounts to is setting SMR section 382 of CST 131 to unity. What happens is that microprocessor 110 always examines SMR 382 before reconnecting any device to know whether or not multipathing reconnection is permitted. Entry activation of CE SMR 349 is from line 335 as at 615. At 616, CST 131 is accessed for setting SMR 382 to unity. At 617, completion of the command is indicated by a CHANNEL END DEVICE END (CEDE). At 618, return is made to CS SCE 330 with an indication that execution of the command has been completed.

Figure 24:
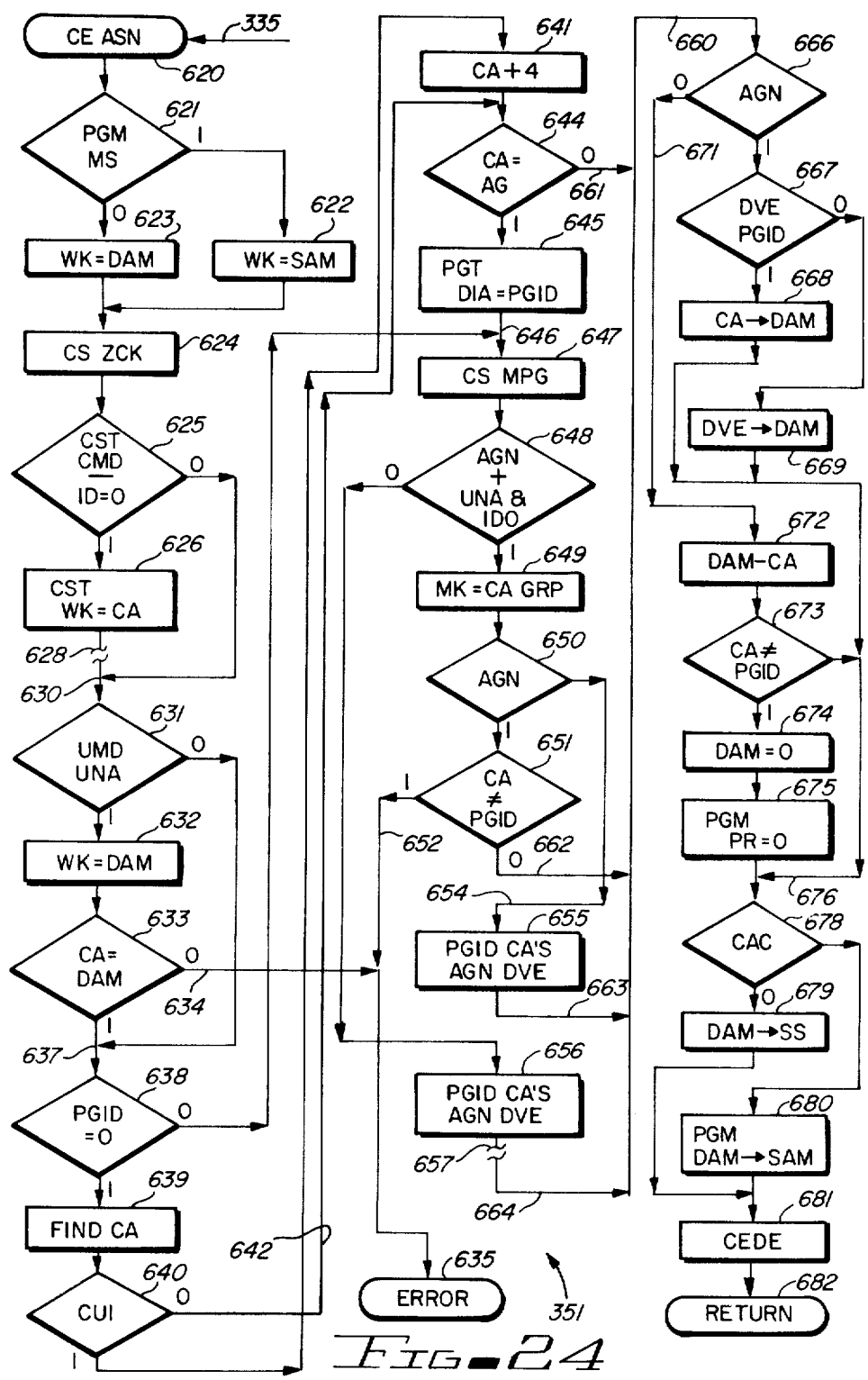

Access group control 332 includes the three modules 351, 352 and 353, all activated via line 335. To establish an access group, logic module CE ASN 351 is activated via line 335 at 620 (FIG. 24). At 621, PGM 146 is examined at its MS section 363 to determine whether or not an access group mask was stored in SAM 361. Depending upon the outcome of this determination, microprocessor 110 at 622 and 623, respectively, transfers the contents of SAM 361 or DAM 359 to work registers (not shown) within microprocessor 110. Then microprocessor 110 at 624 activates logic module CS ZCK 338 as explained earlier with respect to FIG. 18. The action of CS ZCK 338 is to determine if the received PGII with ASSIGN command 281 (FIG. 7) is zero. Following this action, microprocessor 110 at 625 accesses CST 131 to determine the command code bits stored in section 381. If the command indicated in section 381 is an UNASSIGN command or the received PGID is zero (RC=0 as set up at step 534 of FIG. 18), then the channel adaptor 80 identification in section CA 383 of CST 131 is transferred to a work register at 626. Some non-pertinent functions are performed at 628. From juncture 630 which joins the path from 628 and the nontrue exit of step 625, microprocessor 110 at 631 determines if the received command as stored in section 381 of CST 131 is an UNASSIGN command. If it is, then logic module CH RSS 340 is activated at 632 to transfer the appropriate contents of DAM 359 to a work register (not shown) in microprocessor 110. This includes the portion of DAM pertaining to the channel adaptor (path) 80 that received the command plus the portion relating to the addressed device 13 indicated in DADDR of the UNASSIGN command 280. At 633, microprocessor 110 determines whether or not the channel adaptor receiving the UNASSIGN command has assignment of the addressed device as indicated in the DAM 359 signals that were fetched at 632. If there is a nonconcurrence in the access assignment, microprocessor 110 leaves the logic module CE ASN 351 over path 634 to error exit 635. As a result, UNIT CHECK, command reject signal will be sent to host 12 via the channel adaptor 80 that received the UNASSIGN command. If, however, the channel adaptor path has access assignment of the addressed device 13 indicated in the UNASSIGN command, microprocessor 110 proceeds through point 637 which joins the ASSIGN command exit of step 631 to determine if the PGID of the UNASSIGN command 280 is all zeros. If it is non-zero, further action later described will be taken. If it is all zeros (as determined by CS ZCK), then the channel adaptor 80 receiving the command (ASSIGN or UNASSIGN) is identified at 639. This logic step is a loop of instructions that matches the indication fetched at 626 to a workable entity, i.e., left shift until a binary one is in the leftmost position, such that the assignment function can proceed. Then at 640, microprocessor 110 determines which of the control units CU-0 or CU-1 received the command. If it is control unit one, then an offset of four for the four channel unit adaptors in CU-0 is added at 641 to the values set up at 639. If the receiving control unit is CU-0, no offset is required.

Following these actions, microprocessor 110 follows path 642 to determine at 644 whether or not the channel adaptor 80 that received the ASSIGN/UNASSIGN command is in an access group, i.e., presently is in a so-called grouped state. If such channel adaptor 80 is in a grouped state (AG=1), then at 645 the PGID stored in section 376 of PGT 147 for the channel adaptor which received command is transferred to DIA 139. This action places in DIA 139 the PGID which will be used later in the assignment operation. It also acts as a repository for transferring the PGID to the other control unit 11. At 646, the logic paths from step 645 and from step 638 when the PGID is non-zero join. AT 647, microprocessor 110 activates logic module CS MPG 339 for matching the PGID just transferred to DIA 139 and the PGID received with the command (ASSIGN 281 or UNASSIGN 280). The logic module CS MPG 339 was described earlier with respect to FIG. 19. Returning from that logic module, microprocessor 110 has developed a path mask and stored it in a work register within microprocessor 110. At 648, if the received command is an ASSIGN command, or if the command is an UNASSIGN command and the received PGID was zero, a mask MK is formed at 649 which adds the receiving channel adaptor 80 to the mask received from CS MPG 647. Following this action, microprocessor 110 at 650 determines from CST 131 section 381 whether or not the command is an ASSIGN command. If it is an ASSIGN command, at 651 microprocessor 110 determines, based upon the return code from CS MPG 339 at 647, whether or not the PGID of the receiving channel adaptor was matched. If it was not matched, then microprocessor 110 follows logic path 652 to error exit 635. Returning to 650, if the command is not an ASSIGN command, it is an UNASSIGN command. Then microprocessor 110 follows path 654 to 655 for forming a mask consisting of all channel paths having the received PGID and have assignment of the device 13 indicated in DADDR portion of the UNASSIGN command 280 of FIG. 7.

Returning to 648, if the conditions set forth for that logic step were not met, then microprocessor 110 goes to logic step 656 because the command received is an UNASSIGN command and the received PGID is non-zero. Accordingly, at 656 a mask is formed consisting of all channel paths with the received PGID that have the addressed device 13 assigned to the respective channel adaptors. At 657, error checking is performed to determine if there are no paths with the received PGID that have assignment of the device addressed in DADDR portion of the UNASSIGN command 280. If there are no such paths, an exit is taken through error exit 635, the logic path from 657 to 635 is not shown. Without an error condition, microprocessor 110 proceeds as next described.

The last function of the logic module CE ASN 351 is to record the modified assignment mask into DAM 359 and PGM 146. This portion of the logic module is activated via line 660 from a plurality of points. A first point is 661 from step 644 when the channel adaptor receiving the command is not in the grouped state. A second point at 662 is from step 651 when the PGID of the channel adaptor and the received PGID are equal. A third point is from step 655 at 663. The fourth and last entry point is from 664 from the just described step 657. The first logic step in recording the new mask is to determine whether the command is an ASSIGN or UNASSIGN command. For an ASSIGN command, microprocessor 110 at 667 determines if the addressed device 13 identified in DADDR portion of ASSIGN command 281 is presently assigned to a collection of channel paths. If so, at 668 the channel paths from DAM 359 are added into a work register (not shown) of microprocessor 110 for adding the DAM mask to the channel adaptor which received the command, and as shifted in step 637 and 641. On the other hand, if the addressed device 13 at 667 is not in a grouped state (no access limitations), then at 669 the addressed device 13 is always assigned to the determined channel paths.

If at step 666 the received command is an UNASSIGN command, microprocessor 110 follows path 671 to perform the unassign function in steps 672 through 675. At 672 the receiving channel adaptor 80 is deleted from the DAM stored in the work registers. At 673, microprocessor 110 determines whether or not there are any remaining channel paths that are still assigned. If there are none, then the mask for the access group is reset at 674. Also, at 675 the password received section 364 of PGM 146 is reset for the channel adaptor receiving the unassign command. At 676, the assign and unassign functions have been completed. Now it is time for microprocessor 110 to record the modified access group into status store 100 and PGM 146. Before this can be done, microprocessor 110 at 678 determines whether or not a CAC command 279 is currently being executed. This means that the access group structure has been effectively altered for one channel program. If it was altered, then the new mask for the access group is stored in SAM 361 of PGM 146 at 680. If there was no CAC command-altered access grouping, then at 679 microprocessor 110 stores the generated DAM into the status store 110 RAM 265 registers DAM 359. Then at 681 ending status of CHANNEL END and DEVICE END is set up for reporting to host 12. At 682, return is made to CS SCE 330 which will eventually result in the ending status being supplied to the host 12.

The execution of the UNASSIGN command by CW UNA 352 is detailed in FIG. 25. Activation is at 685. At 686, PGM 146 is accessed for resetting the password received section PR 364 to zero. Then at 687, microprocessor determines whether or not a CAC command has altered the access group structure. If not, the status store 100 is accessed at 686 for resetting that portion of DAM 359 relating to the channel adaptor 80 receiving the UNASSIGN command. On the other hand, if a CAC command had altered the access group structure, then microprocessor 110 at 689 accesses PGM 146 for resetting the mask in SAM 361. Ending status is generated at 690 (CHANNEL end, DEVICE end). Return to CS SCE 330 is made at 691.

The access group structure can be overriden by the CAC command in the same way that the suspend multipath reconnection changes the path mode for a single chain of peripheral commands. Additionally, the CAC command 279 performs other functions as was explained with respect to the function access byte FAB (FIG. 7). The received CAC command is stored in DIA 139 as previously mentioned. Activation of the logic module CE CAC 353 (FIG. 26) is at 700 from line 335. At 701, the password PW received with a CAC 279 is transferred from DIA 139 to a work register (not shown) in microprocessor 110 such that at 702 logic module CS ZCK 338 can determine whether or not the password is zero. Then at 703, microprocessor 110 also accesses DIA 139 to transfer FAB to another work register (not shown) within microprocessor 110. At 704, microprocessor 110 determines whether the received password PW is zero (PW was in DIA 139) and the function in FAB is not a generalized unassign function GU. If these conditions are not met, then an error code has to be established. This is achieved by microprocessor 110 building ending status ESTAT at 707 and returning to CS SCE 330 at 708. If the conditions are met that the password is not zero, a valid password may have been received. But first, at 705, microprocessor 110 determines whether or not FAB is valid (V). Validity can be determined by comparing the three sections of FAB to determine whether or not they are consistent. If not, error ending status is built following path 706. On the other hand, if FAB is valid, then at 710 microprocessor determines from PGM 146 whether or not a valid password has been received by examining section 362. If a valid password was received, then at 711 microprocessor 110 compares the equality of the password of DIA 139 and the password stored in PGM 146 section 365. This is a loop process in that microprocessor 110 is a byte wide processor and PW is a multi-byte password. One byte from each password is compared in one instruction. If there is inequality between the passwords at 711, then error status ESTAT is signaled at 712 with ending error status being established at 707 via path 706. If there is equality between the two passwords, at 713 microprocessor 110 accesses PGM 146 to set section VPW to unity. At 714 microprocessor determines if the function is a temporary assign function TA (see FIG. 7 FAB), and prior valid password VPW has not been set, an error condition is signaled at 707 via path 706. Otherwise, at 715 if the assignment mask DAM 359 and status store 100 has not been changed by a CAC command, then the contents of DAM 359 are fetched at 717 by activating logic module CH RSS 340 and are placed in work registers (not shown) of microprocessor 110. Following 717 or path 716 from logic step 715, microprocessor 110 follows path 718 to 720 for accessing CST 131 for transferring contents of section CPM 360 to work registers (not shown) in microprocessor 110. At this point, the appropriate masks are in work registers of microprocessor 100. At 721, microprocessor 110 determines whether or not it is the local control until that has received the CAC command. If it is the local control unit, such as CU-0, at 722, CST 131 is accessed for transferring the contents of CA section 383 to work registers, entitled "CA SAVE" (not shown) of microprocessor 110. On the other hand, if the other control unit CU-1 received the command, then the channel adaptor field has to be adjusted at 723 as previously described. Then at 724, microprocessor 110 determines whether or not it is a new password that was received (NPW=1). For a new password, microprocessor 110 at 725 determines if the device 13 addressed in the CAC command DADDR portion is a member of the PGID of the receiving channel adaptor 80. If not, an error condition has occurred and an error is set up at 726 and reported at 707 via path 706. Following step 725, when the addressed device 13 has the same PGID (access group), microprocessor 110 at 727 determines whether or not a valid password has previously been received, i.e., is the password a first password? For the first password at 728, microprocessor 110 accesses PGM 146 to set VPW section 362 to unity. At 729, contents of CPM 360 are transferred to a work register (not shown) in microprocessor 110. At 730 a loop of instructions is executed, looping through the PGM 146 registers for matching the password of section 365 to the password received with the CAC and also stored in DIA 139. Following step 730 or from step 724, when the password is not a new password, microprocessor 110 follows path 732 to step 733. If the function to be performed by storage system 10 is a temporary path group assignment, as indicated by the TA section of FAB portion of CAC 279 (FIG. 7), then at 734 microprocessor 110 checks VPW 362 of PGM 146. If there is not a valid password, an error indication is built at 735 and reported at 707. For a valid password, at 736, and if the device 13 indicated in the CAC command 279 section DADDR is assigned to a specific group of channel paths and the assignment mask has not been stored previously in the current command chain, then at 737, MS section 363 of PGM 146 for the channel adaptor 80 receiving the CAC command is set to unity. At 738, CPM 360 receives the mask stored in DIA 139 that was received with CAC 279 in section TM (temporary mask). Since an access group always follows changes in path groups, the temporary override via the temporary path group requires the control unit 11 to set up a temporary access group. Attempted accesses to the addressed device 13 by paths outside the temporary path and access group results in a BUSY signal and no error signal. In this vein the temporary path group establishment can also be viewed as a temporary unassign of the addressed device 13 from its access group. Also, SAM 361 receives the contents of CPM 360 such that the regular access group can be re-established upon conclusion of the chain of peripheral commands. Also, DAM 359 of status store 100 is made equal to DIA 139 in the same manner as CPM 360. On the other hand, if at 733 or 736 the above-described steps are not performed, microprocessor 110 executes a generalized unassign function. At 741, microprocessor 110 determines if the channel path that received the peripheral command has assignment of the device indicated in the DADDR portion of that command. If the assignment does not include the receiving channel path, an error is indicated at 742 with ending status being built at 707. More appropriately, the addressed device 13 is assigned to the receiving channel adaptor 80 such that at 743 VPW 362 (PGM 146) is reset. Then at 744, microprocessor 110 determines whether or not DAM 359 has been altered by a CAC command. If not, then the device can be unassigned in the general unassign function GU by making DAM 359 equal to zero for the addressed device 13. This action is achieved by activating logic module CH WSS 343. Then ending status is built at 707 in a usual manner. On the other hand, the general unassign function during a temporary adjustment of the access group results in SAM 361 being reset to zero for unassigning the device when the CAC TA function is completed at the end of the chain of peripheral commands.

The commands SHID, CAC, ASSIGN, UNASSIGN, and SMR as described for FIG. 7 are also called supervisory commands. A MODE SET command (not shown) carries a status modifier for modifying the operation of storage system 10. Such a MODE SET command is executed in the usual manner. Among other things, a MODE SET command can indicate the type of recording that is to occur in a tape drive, for example, as well as instruct storage system 10 to perform other types of operations. Included in these is the setting of flip-flop 52 of FIG. 5. When flip-flop 52 is set within a given chain of peripheral commands, none of the supervisory commands listed above will be honored by peripheral storage system 10. In other words, for any of these commands to be executed they cannot be preceded by a MODE SET command that specifies that flip-flop 52 be set to the active condition. PLA 177 (FIG. 5) includes logic structures (not shown) for decoding the received command and indicating that it is a supervisory type command. When such a supervisory type command is detected, flip-flop 52 is set as well as the register 261, as explained with respect to FIG. 5. If a supervisory command is received when flip-flop 52 is set, the command is not forwarded to microprocessor 110. In other words the interruption signal on line 122-6 is not sent; rather, channel adaptor 80 merely returns a UNIT CHECK signal to the host 12 indicating a command reject. Status signals related to the UNIT CHECK signal are retrieved by host 12 after a UNIT CHECK signal by issuing a SENSE command.

Override-reset control 333 includes two logic modules 355, 356 which are activated when channel adaptor 80 detects the end of a chain as explained with respect to FIG. 5 and sends an interruption signal over line 122-6. Microprocessor 110 responds to the interruption signal to fetch the reason for the interrupt. Channel adaptor 80 indicates at that time to microprocessor 110 via PLA 171 and external registers 118 that a chaining condition has been terminated. At this time, microprocessor 110 knows that it must reset all overrides such as implemented through the CAC command 279 or the SMR command 282 as well as any other overrides that may be used in connection with the present invention. This end of chain condition is detected within microprocessor 110 by logic module CS AAS 355 (FIG. 27) which is activated over lines 354 by CS CCD 329 as previously described. Many functions of logic module CS AAS 355 do not pertain to end of chain, but can pertain to the receipt of a command. Accordingly, after entry of 750, non-pertinent logic functions related to other commands are performed at 751. At 752, microprocessor 110 examines DIA 139 to see if a device 13 is freed, that is, end of chain is indicated by channel adaptor 80. If not, non-pertinent logic functions are performed at 755. Otherwise, logic module CS MDF 356 (FIG. 28) is activated to reset the override control. After completing CS MDF 356, return to CS DCD 329 is made 754.

FIG. 28 shows logic module CS MDF 356 being entered at 760. PGM 146 is examined to see if MS section 363 is set for the device 13 associated with the chain that was just terminated. If MS is set to unity, this means that a CAC has caused a temporary path group to be established for the instant chain of peripheral commands. Accordingly, at 762 microprocessor 110 transfers the contents of SAM 361 to status store 100 by implementing logic module CH WSS 343. Then at 763, microprocessor 110 accesses PGM 146 for resetting MS 363 to zero and to transfer the contents of SAM 361 to CPM 360 for overwriting the TA mask. These actions complete overriding the CAC effect on the access group.

Next, the suspend multipath reconnection must be removed. This activity is initiated at 764 by accessing CST 131 at 765 for re-setting the write mode WM (not shown) to zero and setting SMR 382 to zero. Then at 766 microprocessor 110 accesses BST 137 for resetting the engaged or busy signal (not shown) "B" to zero. At 767 the non-pertinent logic functions are performed with a return to CS AAS 355 at 768.

While the invention has been particularly shown and described with reference to preferred embodiments thereof, it will be understood by those skilled in the art that various changes in form and details may be made therein without departing from the spirit and scope of the invention.

What is claimed is:

1. A peripheral data processing system having a control unit connected to a plurality of peripheral devices for selectively transferring information-bearing signals between said devices and a plurality of hosts connectable to said control unit over a plurality of paths connecting the hosts to said control unit and for sending peripheral commands to said control unit, means coupled to said paths for establishing said paths into a plurality of path groups extending between said control unit and said connectable hosts, and each path group having one or more paths means in said control unit for enabling use of any path in a given path group, and only in said path group, for diverse communications by a device using said path group, said control unit and peripheral devices capable of performing diverse peripheral data processing operations; the improvement including in combination:

assign means in the control unit and being coupled to said path means and said paths for receiving commands from a connected host for being responsive to predetermined peripheral commands supplied by such connected hosts for selectively and dynamically assigning and indicating assigned ones of said devices to operate with certain ones of said connected hosts, said assign means being capable of assigning a plurality of said devices to one or more of said hosts in a plurality of access groups;

sense means in the control unit and being coupled to said path means and said paths for being responsive to a status request peripheral command supplied by any of said connected hosts to supply status signals thereto via said coupled paths irrespective of said access groups;

unit check means in the control unit and being coupled to said path means and said paths for being responsive to a request received from a first requesting host via any path not a member of said access group of said assigned ones of said devices to signal a request error via said coupled paths to said first requesting host;

unassign means in the control unit and being coupled to said path means and said paths for being responsive to any unassign peripheral command received from a host via said coupled path means and over a path a path which is a member of said assigned ones of said device's access access group to actuate said assign means to remove the host from said access group; and control means in the control unit coupled to said assign means for detecting error conditions possibly relating to said assign means and for inhibiting said assign means from assigning a device to any of said access groups upon detection by said control means of predetermined error conditions.

2. The system set forth in claim 1 wherein said control means detects receipt of an assign command outside a path group for detecting a one of said predetermined error conditions.

3. The system set forth in claim 1 further including access control limiting means coupled to said path means for limiting communications in a given path group for a given device to a predetermined portion of paths in said path group for a predetermined set of peripheral operations and then resetting said limiting.

4. The system set forth in claim 3 wherein said access means establishes said predetermined portion of paths or a single path for a one of said devices, and
  chain means in said control unit and being coupled to said paths, said path means, said assign means, said sense means, said unassign means, said control means, said access control limiting means, and said unit check means for indicating a chain of peripheral operations as a said predetermined set of peripheral operations.

5. The system set forth in claim 1 further including access control overriding means being coupled to said paths, said path means, said assign means, said unassign means and said control means for being responsive to a first given peripheral command received from a host via any one of said paths to establish an access path to an addressed device over one given path irrespective of said access groups only for a one of said predetermined sets of peripheral operations.

6. The system set forth in claims 1 or 3 further including access control security means being coupled to said paths, said path means, said assign means, said unassign means, and said control means for being responsive to a second given peripheral command to establish a password for received ones of said peripheral commands to be met before enabling operation of said assign means and said unassign means.

7. The system set forth in claims 1, 3 or 5 further including a status store having:

random access memory means being coupled to said path means, said unassign means and said control means and having a plurality of addressable registers for storing signals indicating said access groups and for storing signals indicating said path groups;

a control store having a path group map portion including means for storing a path map and a password for each of said path groups, a path group table portion for each path and for storing path group identification and indications of said path group;

each of said path group map portions having storage means for a stored access group map; and means in said control unit responsive to said peripheral commands for altering said memory means and said control store in accordance therewith and being coupled to said assign and unassign means and to said memory means and said control store.

8. A control for a peripheral system having a plurality of peripheral devices and attachable via a plurality of paths to a plurality of hosts for performing peripheral operations commanded by the hosts via peripheral commands sent to said control;

comprising:
first means being coupled to said paths for being responsive to a first of said peripheral commands for establishing path group allocations for enabling multipath reconnections of said devices to a said hosts connected to said control unit via paths in said established path group allocation;
second means being coupled to said paths for being responsive to a second of said peripheral commands for establishing simultaneously existing dynamic plural access groups of permitted allegiances of said peripheral devices to said hosts via one or more of said path groups; and
third means being coupled to said first and second means for limiting said first means established device multipath reconnections in accordance with said second means existing access groups.

9. The control set forth in claim 8 further including override control means being coupled to said first, second and third means for establishing for one predetermined set of peripheral operations to be performed by a one of said peripheral devices via but one of said paths in a path group usually enabling multipath reconnections, said set of peripheral operations occurring in a limited time indicated by a one of said hosts to said control.

10. The control set forth in claim 8 further including memory means in said control;
said second means having means being coupled to said memory means for recording electrical indications of said access groups in said memory means;
said first means being coupled to said memory means for accessing said memory means before establishing a multipath allegiance for a given device, if said electrical indication indicates no access group corresponding to a multipath allegiance, said first means signaling an error to a one of said hosts via a one of said paths; and
means in the first means also being coupled to said paths for being responsive to an attempted access by a host to a device via a path not in a current path group for said device to send a busy signal to said requesting host via a one of said paths.

11. The control set forth in claim 8 wherein a first of said peripheral commands activates said first means to establish or alter said multipath allegiance,
a second of said peripheral commands activates said second means to establish or alter said access groups, and
means in said second means responsive to said first means to alter a multipath allegiance to alter a corresponding one of said access groups.

12. The control set forth in claims 1 or 11 wherein each access group has a unique identification,
memory means in the control and being coupled to said first, second and third means and for storing each said unique identifications and storing a map of electrical indications for a corresponding one of said access groups having a plurality of devices; and
said first means being responsive to a first peripheral command having a first one of said unique identifications to establish a multipath allegiance for a device identified in said first peripheral command having paths of an access group of an addressed one of said devices.

13. A peripheral system attachable to a plurality of hosts via a plurality of paths and having a plurality of peripheral devices;
including, in combination:
first means, being coupled to said paths and said devices for electrically indicating a present allegiance of said devices to said hosts via a plurality of groups of said paths, respectively;
second means being coupled to said paths and said first means to electrically indicate a present set of permitted allegiances of said devices to hosts via a plurality of access groups, some of said paths being in a plurality of said access groups;
third means being coupled to said paths and said second means for electrically inter-coupling said first and second means for limiting said first means indications for each said device to said second means indications for each said device; and
fourth means being coupled to said paths, said devices and said first means for selectively connecting said devices and hosts via said paths in accordance with said first means indications.

14. The peripheral system set forth in claim 13 wherein said second means being for electrically indicating a plurality of said path groups in each of said access groups.

15. A peripheral system having a control unit connected to a plurality of peripheral devices and having a plurality of means for transferring signals to and from said devices;
the improvement including in combination:
the control unit having a plurality of host adaptors, each host adaptor having channel processing control means including chain means for indicating a chain of commands and supervisory control means indicating acceptability of system logic control commands to be received from a host;
a programmed processor in said control unit electrically connected to said channel processing control means and with a control memory for containing program indicia for requiring said programmed processor to control the peripheral system;
said control memory stored indicia including:
a path group control indicia being for enabling said programmed processor to set, alter and disband path groups consisting of predetermined ones of said host adaptors and a one of said devices such that said one device can reconnect to a host via any one of said host adaptors within such path group, said one device selectively owing allegiances to a host via any one of said channel processing control means in a respective path group;
access group control indicia being for enabling aid programmed processor to set, alter and disband access groups for each of said devices and channel processing control means, each device having but one of said access groups and each access group including one or more of said path groups;
said path group control indicia being for further enabling said programmed processor to activate a path group for a given device only via a one of said host adaptors receiving a command with a device address that is within its access group; and said access group control indicia being further for enabling said programmed processor to alter each access group each time said path group control indicia alters a path group.

16. The peripheral system set forth in claim 15 wherein said control memory stored indicia further includes;

control access indicia in said access group control indicia being for enabling said programmed processor to establish a device allegiance independent of said access and path groups via a one of said host adaptors; and override-reset indicia being for enabling said programmed processor to reset said independent device allegiance when said chain means indicates no current chain of commands.

17. The peripheral system set forth in claim 15 wherein said control memory stored indicia further includes:

control access indicia being for imposing a password control on said peripheral system, one password for each path group, control indicia in said path group and access group control indicia being for enabling said programmed processor to reject received peripheral commands affecting said path groups unless a password matching the control access supplied password, and further indicia being for enabling the programmed processor to alter peripheral system operations so that any device and any path shall have unique communications for duration of a given chain of commands.

18. The machine-implemented method of operating a peripheral system having a plurality of devices selectively connectable to a plurality of hosts via a plurality of paths, the automatic steps of:

assigning said paths to access groups, each said access group consisting of one of said devices and one or more of said paths, assigning some of said paths to a plurality of said access groups, reserving one of said devices via one of said paths in a given access group to a host for data processing operations via one or more of said paths as a path group for said one device, if said devices being reserved do not have an access group, reserve the device, if said devices being reserved have an access group, reserve such said devices only if the said path over which a reservation is being made is included in its respective access group, otherwise refuse the reservation and report an error condition to the reserving host.

19. The machine-implemented method of operating a peripheral system attachable to a plurality of hosts, said peripheral system having a plurality of control units connected to a larger plurality of devices such that any control unit can operate with any device, and each control unit having plurality of host connection adaptors for providing multiple data paths from said hosts to any one of said devices;

the automatic steps of:

in each control unit establishing a table of connections for each said host connection adaptor and for each said device for electrically indicating which of said devices is permitted to communicate through which of said host connection adaptors, upon receipt of a given command through a one of said host connection adaptors, changing said indications in said table of connections, receiving commands for any of said devices as a sequence of separate chained series of commands, in each said series of commands accepting commands received for a given device by said host connection adaptor indicated in said table of connections as being permitted to handle communications for said device, and receiving an additional command indicating, that for commands in the series of commands which includes said additional command, commands will be accepted from the host connection receiving said additional command irrespective of said indications in said table of connections.

20. The machine-implemented method of operating a peripheral system attachable to a plurality of hosts, said peripheral system having a plurality of control units connected to a larger plurality of addressable devices such that any control unit can operate with any device, and each control unit having another plurality of host connection adaptors for providing multiple data paths to any one of said devices, the machine executable steps of:

in each control unit establishing a table of connections for each said host connection adaptor and for each said device for electrically indicating which of said devices is permitted to communicate through which of said host connection adaptors, grouping said host connection adaptors into path groups for communication with one or more devices and indicating said group in said table of connections, assigning one or more of said path groups to each device of a second plurality of said devices, said second plurality being not greater than said larger plurality;

maintaining said table of connections over a sequence of a plurality of chained series of commands, and for a given set of commands in a given chained series of commands limiting communications of an addressed one of said devices to a one path while at any other time permitting said one device to communicate with its indicated plurality of paths in a one of said path groups.

21. The machine-implemented method of operating a peripheral system having a plurality of peripheral devices selectively connectable to a plurality of hosts via a plurality of paths, the automatic steps of:

assigning said devices and paths to dynamically determined access groups of paths such that any device or path can be in none of said access groups, said path can be in one or more of said access groups and one device in each of said access groups, changing said access groups from time to time, reserving said devices to said hosts via said paths in a plurality of sequences of chained peripheral operations in accordance with said access groups, devices not in any of said groups being accessible via any of said paths while devices in an access group being accessible via any of those paths in the same access groups with reconnection being over any path in a group of such paths within said access groups, respectively, independent of which path in such path group initiated a device operation, respectively, and during one chain of peripheral operations for a given device overriding said group operation such that one device communicates via a one of said paths independent of said access groups.

* * * * *

UNITED STATES PATENT AND TRADEMARK OFFICE
CERTIFICATE OF CORRECTION

PATENT NO. : 4,396,984

DATED : August 2, 1983

INVENTOR(S) : Edwin R. Videki, II

It is certified that error appears in the above—identified patent and that said Letters Patent is hereby corrected as shown below:

```
In the title         change "MULTIPLATHING" to --MULTIPATHING--
Col. 1, line 59      change "of peripheral" to --in peripheral--
Col. 7, lines 5-6    change "input-/output" to --input/output--
Col. 7, lines 9-10   change "CAA--CAH" to --CAA-CAH--
Col. 7, line 49      change "device D0-D7" to --devices D0-D7--
Col. 7, line 66      change "CAI-CAH" to --CAE-CAH--
Col. 8, line 34      change "11" to --100--
Col. 8, line 51      change "wuth" to --with--
Col. 8, line 56      change "host" to --(host)--
Col. 8, line 63      change "includes" to --including--
Col. 9, line 4       change "microporcessor" to --microprocessor--
Col. 9, line 68      change "information bearing" to
                              --information-bearing--
Col. 10, line 17     change "area, BRT" to --area.  BRT--
Col. 10, line 67     change "CUSX" to --CUSV--
Col. 11, line 22     change "tags" to --tag--
Col. 12, lines 5-6   change "circuits PLA" to --circuits.  PLA--
Col. 12, line 62     change "188" to --199--
Col. 13, line 15     change "LA 176" to --PLA 176--
Col. 13, line 30     change "144" to --114--
Col. 13, line 43-44  change "input-/output" to --input/output--
Col. 15, line 2      change "PLS" to --PLA--
Col. 15, line 56     change "response" to --responds--
Col. 19, line 33     change "bytes" to --byte--
Col. 19, line 40     change "the the" to --and the--

Col. 19, line 67     change "UNIT CHECk" to --UNIT CHECK--
Col. 20, line 19     change "CHECk" to --CHECK--
```

UNITED STATES PATENT AND TRADEMARK OFFICE
CERTIFICATE OF CORRECTION

PATENT NO. : 4,396,984

DATED : August 2, 1983

INVENTOR(S) : Edwin R. Videki, II

It is certified that error appears in the above—identified patent and that said Letters Patent is hereby corrected as shown below:

| | | |
|---|---|---|
| Col. 23, line 54 | change | "reconnectior" to --reconnection-- |
| Col. 24, line 63 | change | ""1"" to --"1",-- |
| Col. 25, line 5 | change | "mark" to --mask-- |
| Col. 25, line 44 | change | "received Section" to --received (PGID RCD). Section-- |
| Col. 26, line 30 | change | "355 FIG. 27)." to --355 (FIG. 27).-- |
| Col. 28, line 28 | change | "not" to --not-- |
| Col. 28, line 51 | change | "38" to --381-- |
| Col. 29, line 35 | change | "mode, the" to --mode, then-- |
| Col. 32, line 60 | change | "works" to --work-- |
| Col. 34, line 13 | change | "given" to --again-- |
| Col. 35, line 3 | change | "shown in" to --shown) in-- |
| Col. 35, line 4 | change | "with PGID" to --with the PGID-- |
| Col. 35, line 53 | change | "nontrue" to --non-true-- |
| Col. 36, line 1 | change | "UNIT" to --a UNIT-- |
| Col. 37, line 68 | change | "686" to --688-- |
| Col. 38, line 67 | change | "until" to --unit-- |
| Col. 44, line 61 | change | "aid" to --said-- |

Signed and Sealed this

Second Day of October 1984

[SEAL]

Attest:

GERALD J. MOSSINGHOFF

Attesting Officer    Commissioner of Patents and Trademarks